(12) United States Patent
Fukuda et al.

(10) Patent No.: US 9,896,121 B2
(45) Date of Patent: Feb. 20, 2018

(54) ELECTRIC POWER STEERING APPARATUS

(71) Applicant: NSK LTD., Tokyo (JP)

(72) Inventors: Toshihiro Fukuda, Maebashi (JP); Yasuhide Nomura, Maebashi (JP); Tamotsu Oumi, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/519,581

(22) PCT Filed: Dec. 25, 2015

(86) PCT No.: PCT/JP2015/086182
§ 371 (c)(1),
(2) Date: Apr. 17, 2017

(87) PCT Pub. No.: WO2016/104681
PCT Pub. Date: Jun. 30, 2016

(65) Prior Publication Data
US 2017/0282966 A1    Oct. 5, 2017

(30) Foreign Application Priority Data

Dec. 25, 2014  (JP) .................. 2014-262994
Mar. 19, 2015  (JP) .................. 2015-055890
Jun. 18, 2015  (JP) .................. 2015-123076

(51) Int. Cl.
*B62D 5/04* (2006.01)
*H02P 25/22* (2006.01)

(52) U.S. Cl.
CPC .......... *B62D 5/046* (2013.01); *B62D 5/0463* (2013.01); *H02P 25/22* (2013.01); *B62D 5/0403* (2013.01)

(58) Field of Classification Search
CPC ........ B62D 5/0463; B62D 5/046; H02P 25/22
See application file for complete search history.

(56) References Cited

U.S. PATENT DOCUMENTS

2004/0264075 A1* 12/2004 Kolomeitsev ........ B62D 5/0403
                                                              361/23
2006/0032696 A1   2/2006 Phillips
(Continued)

FOREIGN PATENT DOCUMENTS

JP    2004-001643 A    1/2004
JP    2007-237839 A    9/2007
(Continued)

OTHER PUBLICATIONS

Written Opinion for PCT/JP2015/086182, dated Mar. 29, 2016.
International Search Report for PCT/JP2015/086182, dated Mar. 29, 2016.

*Primary Examiner* — Thomas G Black
*Assistant Examiner* — Sze-Hon Kong
(74) *Attorney, Agent, or Firm* — Sughrue Mion, PLLC

(57) ABSTRACT

An electric power steering apparatus that driving-controls a motor via inverters based on a current command value, and applies an assist force by the motor to a steering system, includes multi-system driving systems with the inverters for respective system-windings of the motor which is a multi-system motor, wherein respective multi-system current command value characteristics against a steering torque are applied so as to be disproportionate for left and right steering, to the respective multi-system driving systems, and an assist-control is performed in response to the individual current command value characteristics.

23 Claims, 20 Drawing Sheets

(56) References Cited

U.S. PATENT DOCUMENTS

| | | | |
|---|---|---|---|
| 2008/0297077 A1* | 12/2008 | Kovudhikulrungsri | H02P 21/22 318/400.02 |
| 2012/0303218 A1* | 11/2012 | Tamura | B62D 1/02 701/41 |
| 2013/0179039 A1* | 7/2013 | Uryu | B62D 5/0463 701/42 |
| 2013/0299271 A1* | 11/2013 | Endo | B62D 5/046 180/446 |
| 2014/0019008 A1* | 1/2014 | Nakamura | B62D 6/008 701/42 |
| 2014/0207335 A1* | 7/2014 | Mikamo | B62D 5/046 701/41 |
| 2015/0298727 A1* | 10/2015 | Kimpara | B62D 5/0484 701/43 |
| 2016/0072416 A1* | 3/2016 | Hirotani | H02P 25/22 318/400.02 |
| 2016/0164278 A1* | 6/2016 | Hayashi | B62D 5/0457 318/139 |
| 2016/0172918 A1* | 6/2016 | Hirotani | H02K 1/165 310/198 |
| 2016/0229444 A1* | 8/2016 | Toda | B62D 5/0487 |
| 2017/0012569 A1* | 1/2017 | Koseki | H02P 25/22 |
| 2017/0015348 A1* | 1/2017 | Sasaki | B62D 5/0484 |
| 2017/0033724 A1* | 2/2017 | Kezobo | H02P 29/0241 |
| 2017/0070178 A1* | 3/2017 | Koseki | H02P 27/06 |

FOREIGN PATENT DOCUMENTS

| | | |
|---|---|---|
| JP | 2014-121189 A | 6/2014 |
| JP | 2014-176215 A | 9/2014 |
| JP | 2014-201198 A | 10/2014 |

* cited by examiner

PRIOR ART

PRIOR ART

ELECTRIC POWER STEERING APPARATUS

This is a National Stage of International Application No. PCT/JP2015/086182 filed Dec. 25, 2015, claiming priority based on Japanese Patent Application No. 2014-262994 filed Dec. 25, 2014, Japanese Patent Application No. 2015-055890 filed Mar. 19, 2015 and Japanese Patent Application No. 2015-123076 filed Jun. 18, 2015, the contents of all of which are incorporated herein by reference in their entirety.

TECHNICAL FIELD

The present invention relates to an electric power steering apparatus that driving-controls a motor via inverters based on a current command value which is a steering command, and applies an assist force by means of the motor to a steering system of a vehicle. Particularly, the present invention relates to the electric power steering apparatus that comprises multi-system (at least dual-system) driving systems with the inverters for respective system-windings of the motor which is a multi-system motor (at least dual-system motor), applies respective current command value characteristics against a steering torque so as to be disproportionate to the respective multi-system driving systems at a left steering maneuver and a right steering maneuver, and assist-controls in response to the individual current command value characteristics for the respective driving systems.

In a case of dual-system, one system of a dual-system motor is used for a left steering, the other system is used for a right steering, and then an uncontrollable region does not exist due to eliminating a dead band.

BACKGROUND ART

An electric power steering apparatus (EPS) serves as an apparatus which is equipped with a motor control unit to control a motor. The electric power steering apparatus which provides a steering mechanism of a vehicle with a steering assist torque (an assist torque) by means of a rotational torque of the motor, applies a driving force of the motor being controlled with an electric power supplied from an inverter to a steering shaft or a rack shaft by means of a transmission mechanism such as gears. In order to accurately generate the steering assist torque, such a conventional electric power steering apparatus performs a feedback control of a motor current. The feedback control adjusts a voltage supplied to the motor so that a difference between a current command value and a detected motor current value becomes small, and the adjustment of the voltage applied to the motor is generally performed by an adjustment of duty command values of a pulse width modulation (PWM) control. A brushless motor, which has an excellent maintenance performance, is generally used as the motor.

A general configuration of the conventional electric power steering apparatus will be described with reference to FIG. 1. As shown in FIG. 1, a column shaft (a steering shaft, a handle shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 are provided with a torque sensor 10 for detecting a steering torque Ts of the steering wheel 1 and a steering angle sensor 14 for detecting a steering angle θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key (IG) signal is inputted into the control unit 30 through an ignition key 11. The control unit 30 calculates a current command value of an assist control (steering assist) based on a steering torque Ts detected by the torque sensor 10 and a vehicle speed Vs detected by a vehicle speed sensor 12, and controls a current supplied to the motor 20 for EPS based on a voltage control command value Vref obtained by performing compensation and so on with respect to the current command value.

As well, a steering angle sensor 14 is not indispensable and may not be provided. It is possible to obtain the steering angle from a rotational position sensor such as a resolver connected to the motor 20.

A controller area network (CAN) 40 to receive/send various information of a vehicle is connected to the control unit 30, and it is possible to receive the vehicle speed Vs from the CAN 40. Further, it is also possible to connect a non-CAN 41 receiving/sending a communication, analog/digital signals, a radio wave or the like except with the CAN 40 to the control unit 30.

In such an electric power steering apparatus, the control unit 30 mainly comprises a micro controller unit (MCU) (including a CPU (Central Processing Unit), an MPU (Micro Processing Unit) and so on), and general functions performed by programs within the MCU are, for example, shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31. The current command value calculating section 31 calculates a current command value Iref1, based on the steering torque Ts and the vehicle speed Vs with reference to an assist map or the like, which is a control target value of a current supplied to the motor 20. The calculated current command value Iref1 is inputted into a current limiting section 33 via an adding section 32A, the current command value Irefm that is limited the maximum current in the current limiting section 33, is inputted into a subtracting section 32B.

A deviation I (=Irefm−Im) between the current command value Irefm and a motor current value Im which is fed-back is calculated in the subtracting section 32B, and the deviation I is inputted into a proportional-integral (PI)-control section 35 for improving a current characteristic of the steering operation. The voltage control command value Vref that the characteristic is improved in the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. An FET is used as a driving element in the inverter 37, and the inverter 37 comprises a bridge circuit of the FETs.

A compensation signal CM from a compensation signal generating section 34 is added at the adding section 32A. A characteristic compensation of the steering system is performed by adding the compensation signal CM, and then a convergence, an inertia property and so on are improved. The compensating section 34 adds a self-aligning torque (SAT) 34-3 with an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM.

In such the electric power steering apparatus, clients (users) feel an uncomfortable steering feeling near a handle center and request for improvement thereof increases as a recent situation. A mechanical clearance near the handle center at a time of the vehicle driving, an existence of the dead band near the handle center as shown in FIG. 3 and an existence of inflection points C1 and C2 (rise-up of discontinuous assist torque) when the system deviates from the dead band are considered as one of causes of the above situation. In the conventional electric power steering apparatus, a fine control cannot be functioned with respect to the dead band near the handle center, and there is a possibility that a driver may feel uncomfortable.

For example, Japanese Unexamined Patent Publication No. 2007-237839 A (Patent Document 1) discloses the electric power steering apparatus which improves the steering feeling of the driver near the handle center. In Patent Document 1, the apparatus includes an actuator (motor) which can adjust the steering torque, calculates a target steering angle based on the steering torque, and controls an output torque of the actuator such that an actual steering angle is coincident with the target steering angle. In this case, when a direction of the steering torque varies by means of the steering of the driver, the target steering angle is set to a constant value or almost a constant value until a predetermined variation in the steering torque occurs.

THE LIST OF PRIOR ART DOCUMENTS

Patent Documents

Patent Document 1: Japanese Unexamined Patent Publication No. 2007-237839 A
Patent Document 2: Japanese Unexamined Patent Publication No. 2014-121189 A

SUMMARY OF THE INVENTION

Problems to be Solved by the Invention

However, in the apparatus disclosed in Patent Document 1, a factor of the dead band exists in an electric system, and it is an essential problem that the factor itself cannot be controlled. Further, the control is discontinuous (inflection point) in the neighborhood (a region varying from the dead band to the controllable region) deviated from the dead band, and it is concerned that the driver feels the uncomfortable feeling.

In the apparatus disclosed in Japanese Unexamined Patent Publication No. 2014-121189 A (Patent Document 2), plural wire-connected motors and plural driving apparatuses are described. However, the apparatuses are subjected to the fifth-order higher harmonic components and the seventh-order higher harmonic components, and are not subjected to the control near the handle center. Accordingly, the apparatuses cannot meet with the above requirement.

In addition to these situations, a problem of a pull/drift (pulling away from straight-ahead driving) exists as a difficulty of the steering feeling of the driver in the neighborhood of the handle center. Since transverse gradient amount (cross-fall) 1 to 2% on a paved surface of a road is existed from a center line to a road shoulder for the purpose of draining or the like, the vehicle tends to be pulled/drifted to the road shoulder direction if the driver does not keep the handle for a long time in a case of high-speed driving on a straight road. Further, in a case that a wheel misalignment occurs due to a secular variation of the vehicle (for example, a permanent set-in fatigue of a suspension bush or a secular variation of a vehicle body), a collision to a curb and so on, the vehicle cannot straightly travel (the lateral flow) if the driver does not keep the handle by strong force. It is concerned that the driver takes on a burden in such a driving.

The present invention has been developed in view of the above-described circumstances, and an object of the present invention is to provide the electric power steering apparatus that applies respective current command value characteristics against the steering torque so as to be disproportionate at the left steering maneuver and the right steering maneuver, to respective multi-system driving systems which constitute a redundant system, and performs the assist-control in response to the individual current command value characteristics for the respective driving systems, or dramatically decreases an influence due to the dead band and the inflection point, does not give the uncomfortable feeling to the driver by eliminating the factor of the dead band and controlling the disproportionate torque generation at the left steering maneuver and the right steering maneuver, and decreases a stress of the driver by suppressing the pull/drift.

Means for Solving the Problems

The present invention relates to an electric power steering apparatus that driving-controls a motor via inverters based on a current command value which is a steering command, and applies an assist force by means of the motor to a steering system of a vehicle, and the above object of the present invention is accomplished by which the electric power steering apparatus comprising multi-system driving systems with the inverters for respective system-windings of the motor which is a multi-system motor, wherein the electric power steering apparatus applies respective multi-system current command value characteristics against a steering torque so as to be disproportionate to the respective multi-system driving systems at a left steering maneuver and a right steering maneuver, and assist-controls in response to the individual current command value characteristics for the multi-system driving systems.

The above object of the present invention is effectively accomplished by that; wherein the multi-system current command value characteristics have offsets near a handle center and have characteristics that a difference of offset amounts is larger when an absolute value of the steering torque becomes larger; or wherein a degree of the offset is changeable characteristic; or wherein the changeable characteristic is a vehicle speed sensitive characteristic; or wherein the vehicle speed sensitive characteristic has a smaller offset near the handle center, and has a larger or smaller degree of a difference of the offset amounts as the vehicle speed becomes higher; or wherein all of the multi-system motor, the multi-system driving systems and the multi-system current command value characteristics have at least dual-system; or wherein the motor has a dual-system windings of a star-connection; or wherein the motor has a dual-system windings of a delta-connection; or wherein all of the multi-system motor, the multi-system driving systems and the multi-system current command value characteristics are dual-system, one part of a dual-system motor is used to one direction region by a current command value for one direction, and the other part of the dual-system motor is used to the other direction region by a current command value for the other direction; or wherein the one-direction current command value has an offset 1 and the other-direction current command value has an offset 2 near a handle center; or wherein the one-direction current command value increases as the steering torque becomes larger in the one direction region and the other-direction current command value increases as the steering torque becomes larger in the other direction region; or wherein varying characteristics of the one-direction current command value and the other-direction current command value are changeable; or wherein the offset 1 is equal to the offset 2; or wherein the offset 1 is different from the offset 2; or wherein the offset 1 and the offset 2 varies in response to the vehicle speed.

Further, the present invention relates to an electric power steering apparatus that driving-controls a motor via inverters based on a current command value which is a steering command, and applies an assist force by means of the motor to a steering mechanism of a vehicle, and the above object of the present invention is accomplished by that: wherein the motor is at least dual-system motor and the inverters are provided for respective system-windings of the motor, wherein one part of the at least dual-system motor is used to one direction region by a one-direction current command value and other part of the at least dual-system motor is used to other direction region by an other-direction current command value, and wherein the one-direction current command value and the other-direction current command value has an offset 2 near a handle center, and the offset 1 and the offset 2 are calculated based on a travel state of the vehicle and an acting force applied to the steering mechanism.

The above object of the present invention is effectively accomplished by that: wherein the offset 1 and the offset 2 vary in response to the acting force when a travel state of the vehicle is a straight-travel state; or wherein in the straight-travel state, the offset 1 increases as the acting force becomes larger in the one direction region, and the offset 2 increases as the acting force becomes larger in the other direction region; or wherein in the straight-travel state, the offset 2 decreases as the acting force becomes larger in the one direction region, and the offset 1 decreases as the acting force becomes larger in the other direction region; or wherein the offset 1 and the offset 2 respectively return to initial values based on a rotational angle and the acting force of the steering mechanism when the vehicle deviates from the straight-travel state; or wherein the offset 1 and the offset 2 gradually vary and gradually return to the initial value; or wherein varying characteristics of the current command value for the one direction and the current command value for the other direction are changeable; or wherein the acting force is a self-aligning torque or a steering torque.

Effects of the Invention

Since the electric power steering apparatus of the present invention applies the multi-system current command value characteristics against a manual input (a steering torque) so as to be disproportionate at a left steering maneuver and a right steering maneuver, to the respective multi-system driving systems which constitute a redundant system, and assist-controls in response to the individual current command value characteristics for the respective driving systems, the dead band and the discontinuity (the inflection point) are removed and the driver does not feel the uncomfortable feeling. Further, because the dead band near the handle center of the electric system is eliminated, and the current command values of the left steering and the right steering are calculated and controlled such that the current command values of the left steering and the right steering are disproportionate at the left steering maneuver and the right steering maneuver, the discontinuity (the inflection point) is removed.

Since the electric power steering apparatus assist-controls by the respective multi-system current command value characteristics against the steering torque, the uncontrollable region also disappears.

In the region of the large manual input (the steering torque), the torque generated in the motor are the same phase, as a result, the assist output becomes large and then an effective steering assist can be realized. Because the multi-systems are controlled by the individual driving systems (the current command values), even in a case that one system is failed or occurs an abnormality, the assist-control can be continued by backing up the failed system by means of other normal driving systems.

Further, the offsets of the current command values of the left and right steerings in the neighborhood of the handle center are individually set, and the stress of the driver due to the pull/drift can be decreased by detecting the pull/drift of the vehicle and adjusting the respective offsets.

MODE FOR CARRYING OUT THE INVENTION

The present invention is an electric power steering apparatus that driving-controls a motor via inverters (GDM (Gate Drive Module) is available) based on a current command value which is a steering command and applies an assist force to a steering system of a vehicle by the motor. The electric power steering apparatus of the present invention eliminates a dead band of an electric system which is a conventional problem and constitutes a redundant system. Then, the electric power steering apparatus comprises multi-system (at least dual-system) driving systems with inverters for respective system-windings of the motor which is a multi-system motor (at least dual-system motor), applies respective current command value characteristics against a steering torque so as to be disproportionate to the respective multi-system driving systems at a left steering maneuver and a right steering maneuver, and to assist-control in response to the individual current command value characteristics for the respective driving systems.

The respective current command value characteristics have offsets near zero of a manual input (steering torque), that is, near a handle center, and have characteristics that curvedly increase as an absolute value of the steering torque becomes larger. A flat characteristic, the offset, a degree of a curve and so on can be tuned, or may be vehicle speed sensitive.

According to the present invention, since the dead band and a discontinuity (an inflection point) in an output characteristic do not exist against the respective current command values, a driver does not feel uncomfortable, and a steering feeling can be improved. Because the motor is multi-system wirings (at least dual-system wirings), and the respective system wirings are individually driving-controlled, it is a large advantage to a reduction in space.

Further, since a left steering or a right steering is performed near the handle center, the steering feeling is further improved. Furthermore, a travel state of the vehicle is judged, the offsets F1 and F2 are adjusted based on a judgement result of the travel state, an acting force (a self-aligning torque (SAT), the steering torque, a reaction force of a column shaft or the like), and an assist is applied to a steering mechanism so as to prevent a pull/drift of vehicle. Consequently, the stress of the driver decreases.

Figure 1:
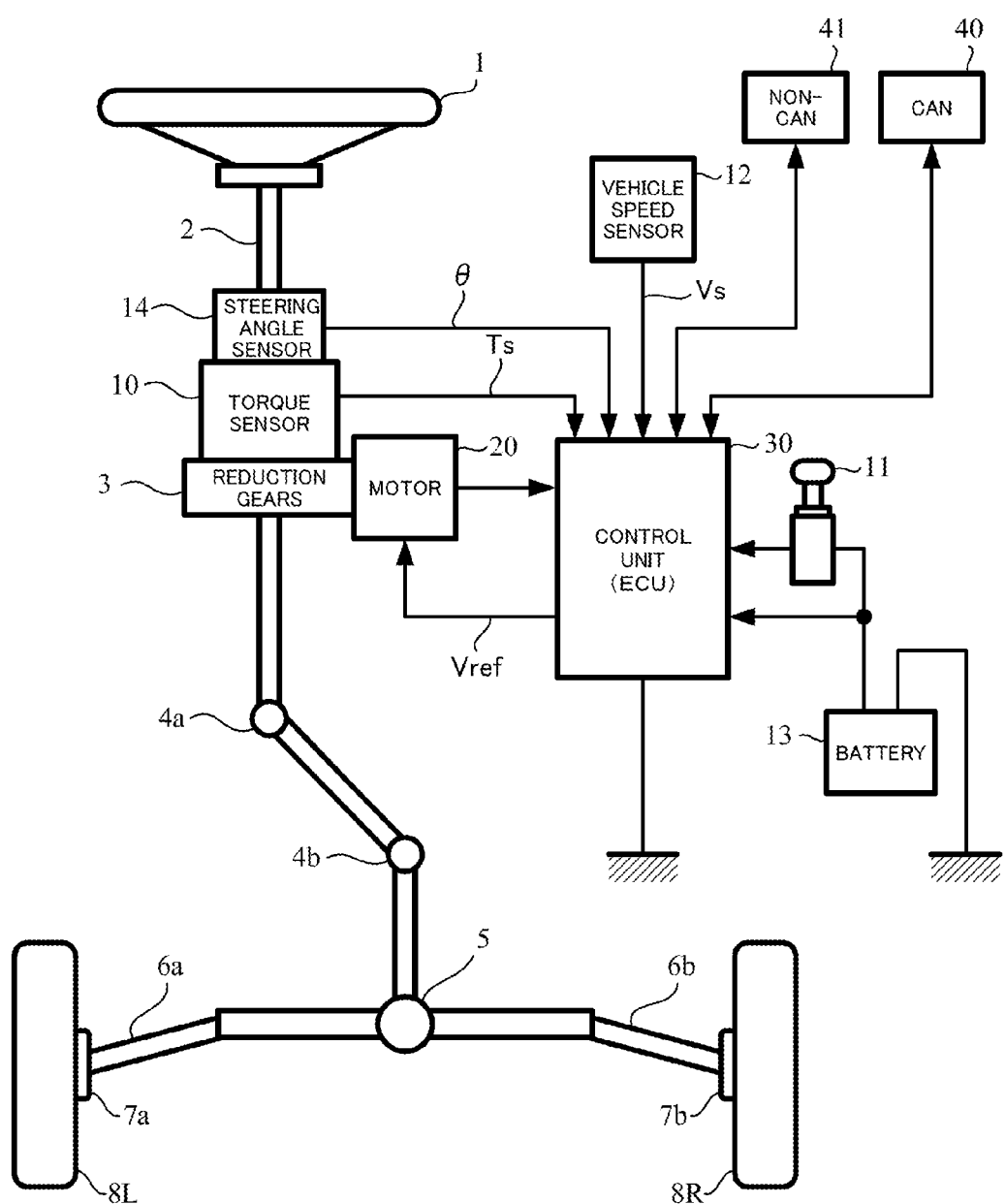
FIG. 1 is a configuration diagram illustrating a general outline of an electric power steering apparatus.

As well, although the preset invention can use to a column assist type as shown in FIG. 1, a rack assist type and a pinion assist type may be used if a configuration of embodiments is available. The preset invention can be available to an apparatus with a transfer ratio variable device.

Hereinafter, embodiments of the present invention will be described with reference to the accompanying drawings.

At first, a three-phase motor with a multi-system motor which applies to the preset invention will be described with reference to FIGS. 4 and 5 as an example of the dual-system motor.

Figure 4:
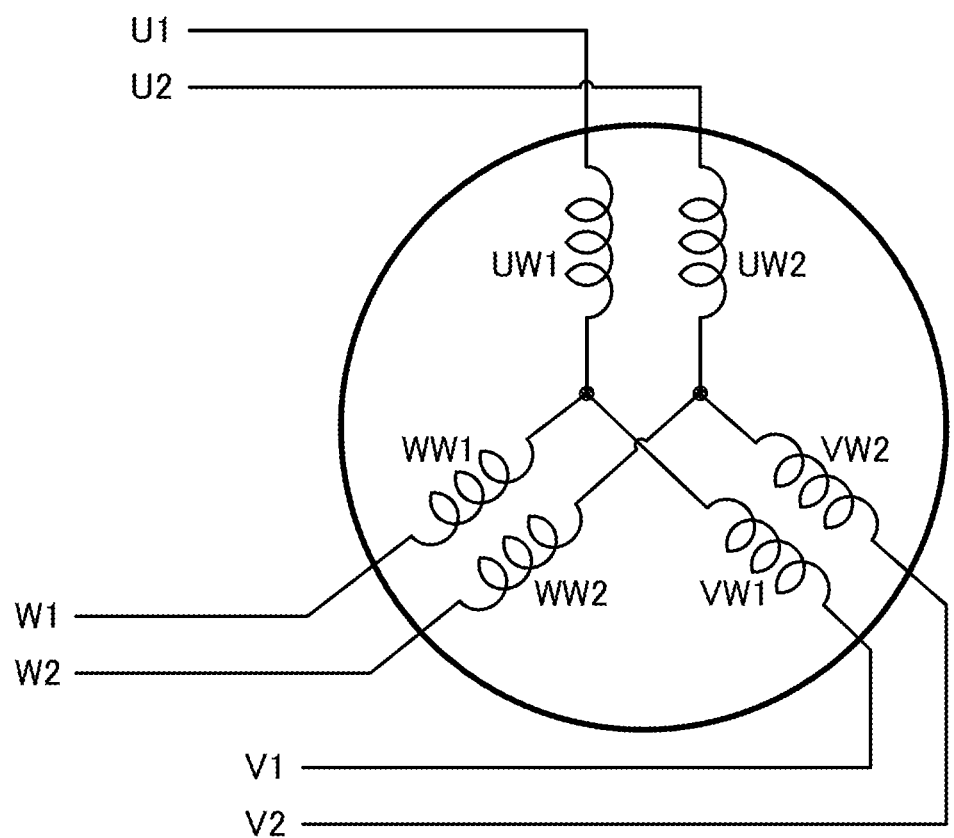
FIG. 4 is a schematic view showing a winding structure (a star-connection) of a dual-system motor.
Figure 5:
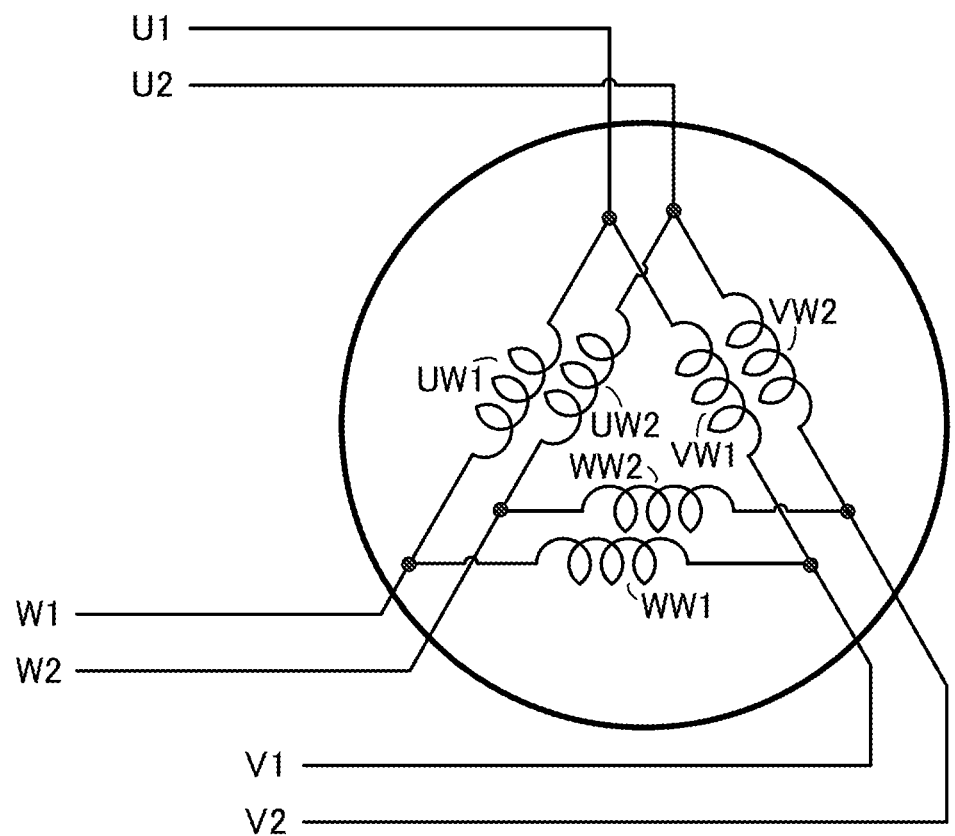
FIG. 5 is a schematic view showing the winding structure (a delta-connection) of the dual-system motor.

FIG. 4 shows a three-phase motor with a star-connection, one system is constituted by a U-phase winding UW1, a V-phase winding VW1 and a W-phase winding WW1, and the other system is constituted by a U-phase winding UW2, a V-phase winding VW2 and a W-phase winding WW2. The motor is driven by passing currents through the windings UW1 to WW1 or the windings UW2 to WW2. FIG. 5 shows the three-phase motor with a delta-connection, one system is constituted by the U-phase winding UW1, the V-phase winding VW1 and the W-phase winding WW1, and the other system is constituted by the U-phase winding UW2, the V-phase winding VW2 and the W-phase winding WW2. The motor is driven by passing currents through the windings UW1 to WW1 or the windings UW2 to WW2. The motor which is used in the present invention may be the star-connection or the delta-connection.

For such the dual-system motor in the present invention, dual-system driving systems which driving-control the dual-system motor individually are provided. One system (the first system) is disproportionately controlled at the left steering maneuver and the right steering maneuver by a current command value Iref1 based on, for example, a current command value characteristic IC1 of FIG. 6, and the other system (the second system) is disproportionately controlled at the left steering maneuver and the right steering maneuver by the current command value Iref2 based on, for example, a current command value characteristic IC2 of FIG. 6.

Figure 6:
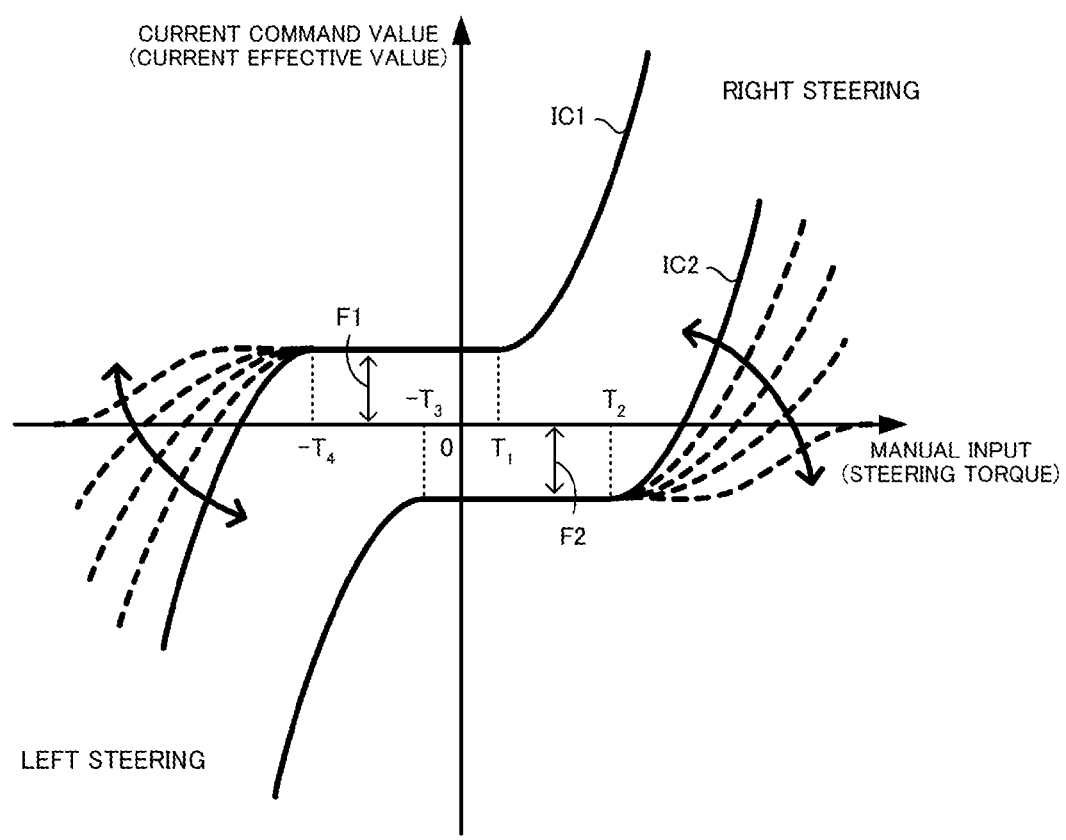
FIG. 6 is a characteristic view showing an operating principle (current command value characteristics) of the present invention (the first embodiment)

For the current command value characteristics (effective current values) of FIG. 6, in a right steering region which a manual input (the steering torque) is positive, the current command value characteristic IC1 has an almost flat positive offset F1 until a predetermined value $T_1$ and curvedly increases as the manual input (the steering torque) becomes larger than the predetermined value $T_1$, and in a left steering region which the manual input (the steering torque) is negative, the current command value characteristic IC1 has the almost flat positive offset F1 until a predetermined value $-T_4$ and curvedly decreases as the manual input (the steering torque) becomes smaller than the predetermined value $-T_4$. Then, the current command value characteristic has a disproportionate characteristic at the left steering maneuver and the right steering maneuver. A decrease characteristic of the negative direction may vary with vehicle speed sensitive or tuning. Further, in the right steering region which the manual input (the steering torque) is positive, the current command value characteristic IC2 has an almost flat negative offset F2 until a predetermined value $T_2$ and curvedly increases as the manual input (the steering torque) becomes larger than the predetermined value $T_2$, and in the left steering region which the manual input (the steering torque) is negative, the current command value characteristic IC2 has the almost flat negative offset F2 until a predetermined value $-T_3$ and curvedly decreases as the manual input (the steering torque) is smaller than the predetermined value $-T_3$. Then, the current command value characteristic has a disproportionate characteristic at the left steering maneuver and the right steering maneuver. An increase characteristic of the positive direction may vary with vehicle speed sensitive or tuning.

As well, the characteristics of the right steering and the left steering are exchangeable, predetermined values $T_1$, $T_2$, $-T_3$, and $-T_4$ of the manual input (the steering torque) which determines a flat characteristic can arbitrarily be set, and the offset F1 and the offset F2 may be different (disproportion) or same (proportion). Especially, in order to prevent from a pull/drift of a vehicle, it is preferable to set the offsets disproportionate. The flat characteristics, the offsets F1 and F2, and the respective degrees of curves of the characteristics IC1 and IC2 may be changeable or have vehicle speed sensitive-characteristics. In a case of the vehicle speed sensitive-characteristic, the flat characteristics are narrow, the offsets are small, and the degrees of the curves are large as the vehicle speed becomes higher.

Figure 7:
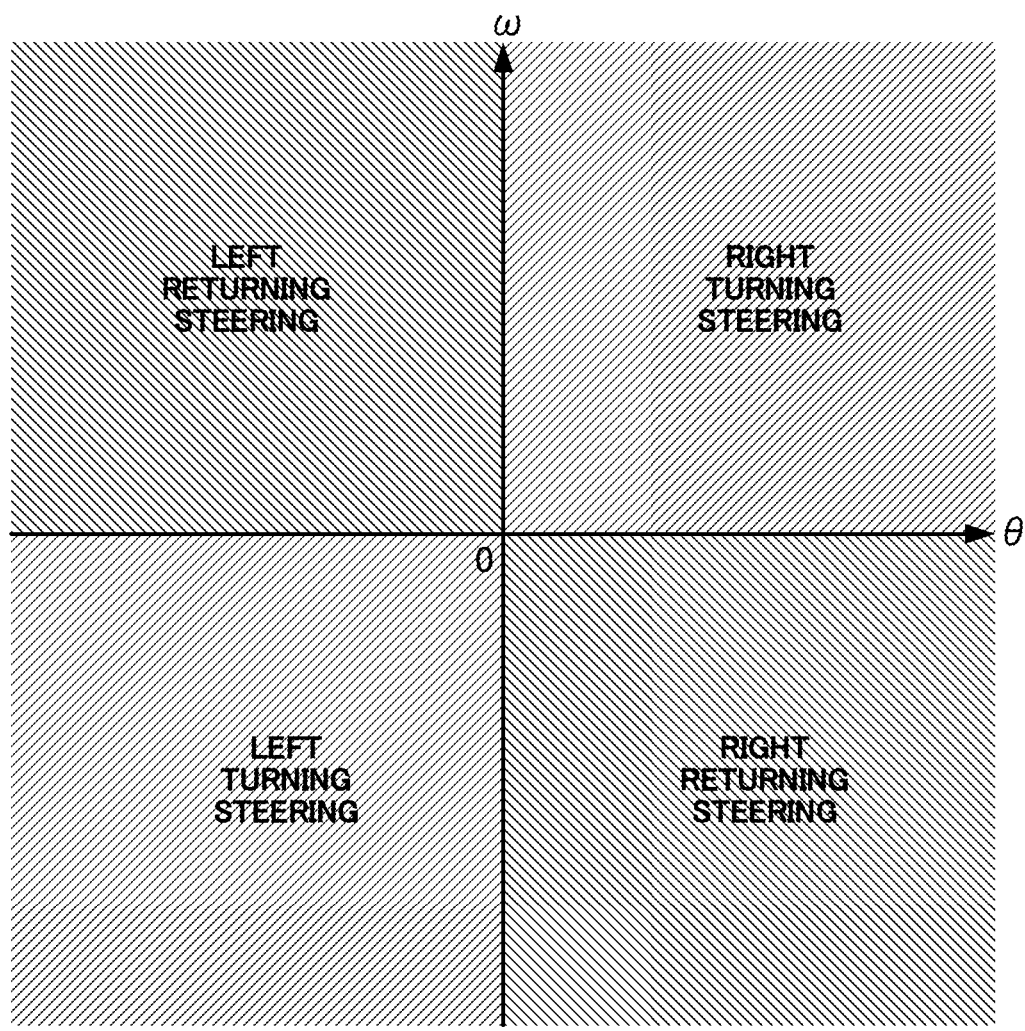
FIG. 7 is a view of explaining a right steering and a left steering.

Further, the judgement of the right steering and the left steering which includes a turning steering and a returning steering can be performed by using a steering angle θ and a motor angular speed ω, for example, as shown in FIG. 7.

Figure 8:
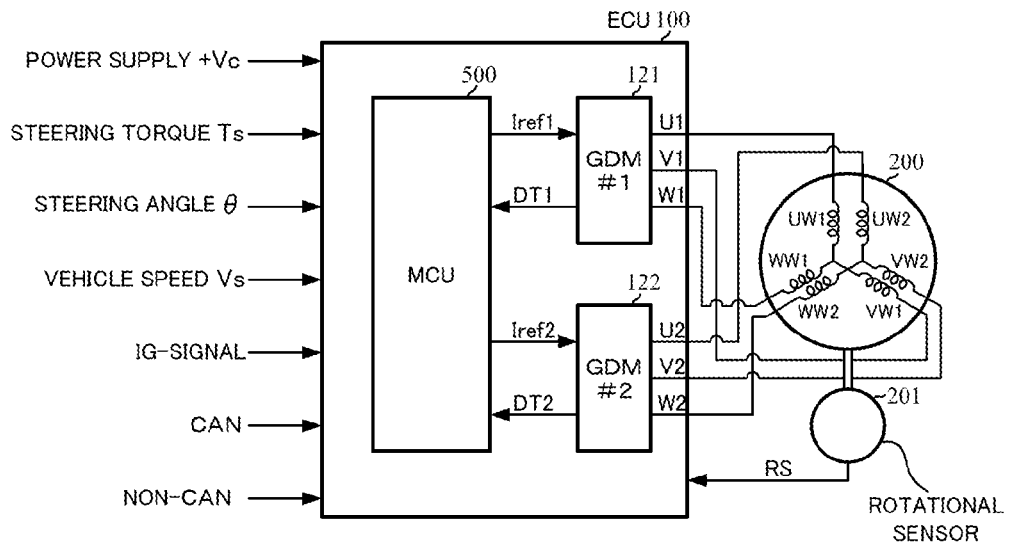
FIG. 8 is a block diagram showing a configuration example of the present invention.

FIG. 8 shows a configuration example of the present invention, and a control unit (ECU) 100 that driving-controls a motor 200 which is a dual-system motor, performs calculations of the current command values Iref1 and Iref2 with respect to respective driving systems based on the current command value characteristics IC1 and IC2 of FIG. 6, the steering torque Ts and the vehicle speed Vs, and judges the left steering or the right steering. The control unit 100 includes an MCU 500 having various compensation functions, and dual-system gate drive modules (GDMs) 121 and 122 which individually assist-control respective driving systems. The steering torque Ts, the steering angle θ, the vehicle speed Vs and an ignition signal IG are inputted into the ECU 100, and a power supply +Vc, a CAN and a non-CAN are connected to the ECU 100. The current command value Iref1 and Iref2 are inputted into the GDMs 121 and 122, respectively, the GDM 121 drives one system of the motor 200, and the GDM 122 drives the other system of the motor 200. The GDMs 121 and 122 include a motor relay (contact point-type or semiconductor-type), a monitor, an interface for a diagnosis, a current control section, inverters, a balance adjustment function (software and hardware) and so on, and the MCU 500 includes a correction function between the current command values Iref1 and Iref2. Further, a motor rotational signal RS from a rotational sensor 201 such as a resolver which is connected to the motor 200 is inputted into the ECU 100.

The MCU 500 performs a judgement of the left steering or the right steering based on the steering torque Ts, the steering angle θ, the vehicle speed Vs and so on, calculates the current command values Iref1 and Iref2 based on the current command value characteristics IC1 and IC2, the steering torque Ts and the vehicle speed Vs, and inputs the calculated current command values Iref1 and Iref2 into the GDMs 121 and 122. The GDM 121 assist-controls by driving of the first system motor windings UW1, VW1 and WW1 of the motor 200, and the GDM 122 assist-controls by driving of the second system motor windings UW2, VW2 and WW2 of the motor 200. The monitor values DT1 such as currents and voltages measured in the GDM 121 are fed-back to the MCU 500, and the monitor values DT2 such as the currents and the voltages measured in the GDM 122 are also fed-back to the MCU 500.

Further, the MCU 500 sets the offset F1 of the current command value characteristic IC1, the flat characteristic (a torque width between the steering torque $T_1$ and the steering torque $-T_4$), and the degree of the curve, and calculates the current command value Iref1. The MCU 500 sets the offset F2 of the current command value characteristic IC2, the flat characteristic (the torque width between the steering torque $T_2$ and the steering torque $-T_3$), and the degree of the curve, and calculates the current command value Iref2. Since the current command values Iref1 and Iref2 have characteristics, for example, as shown in FIG. 6, the current command values Iref1 and Iref2 are not zero near the handle center, and have the predetermined offsets F1 and F2. The first system and the second system of the motor are in a driven state near the handle center. Accordingly, the dead band does not exist near the handle center, the motor is driven by the individual systems, and steering is not discontinuous due to the inflection point or the like.

Since the dual-systems are controlled by the individual GDMs 121 and 122 by means of the respective current command values Iref1 and Iref2, even one system is failed or an abnormality and the other normal driving system can back up the one system and can continue the assist-control.

Figure 9:
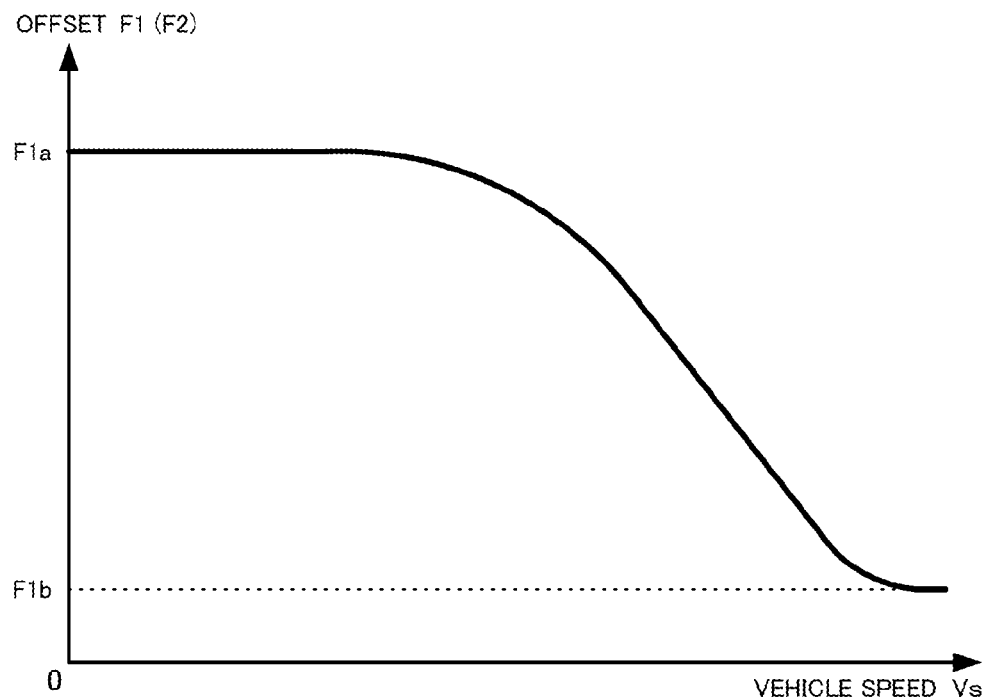
FIG. 9 is a characteristic view showing a varying example of an offset (vehicle speed sensitive)
Figure 10:
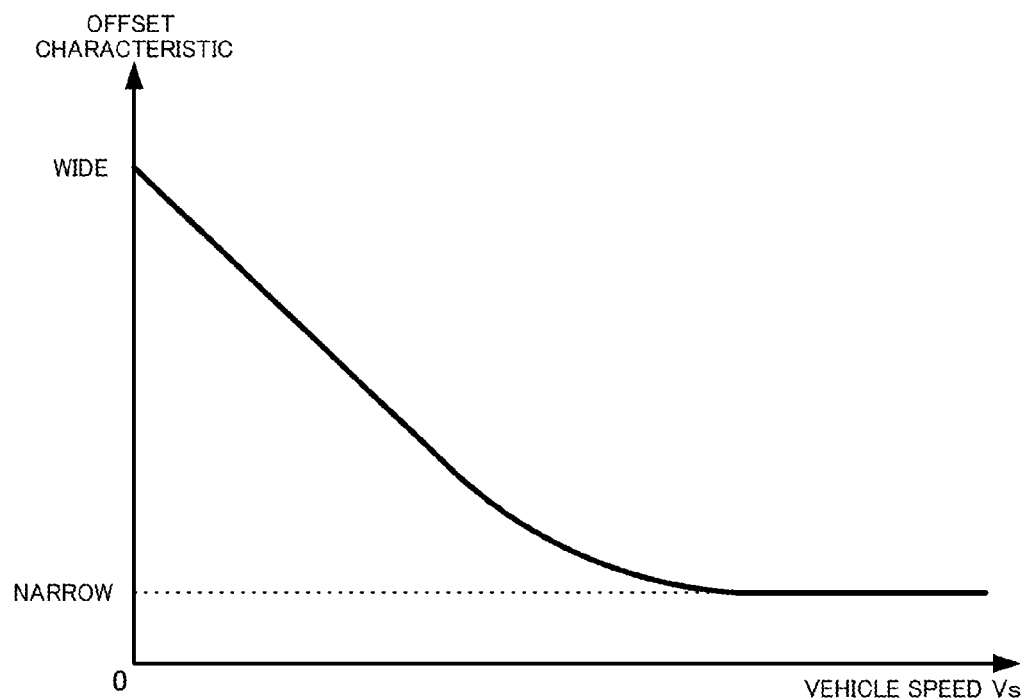
FIG. 10 is a characteristic view showing a varying example of a flat characteristic (vehicle speed sensitive)
Figure 11:
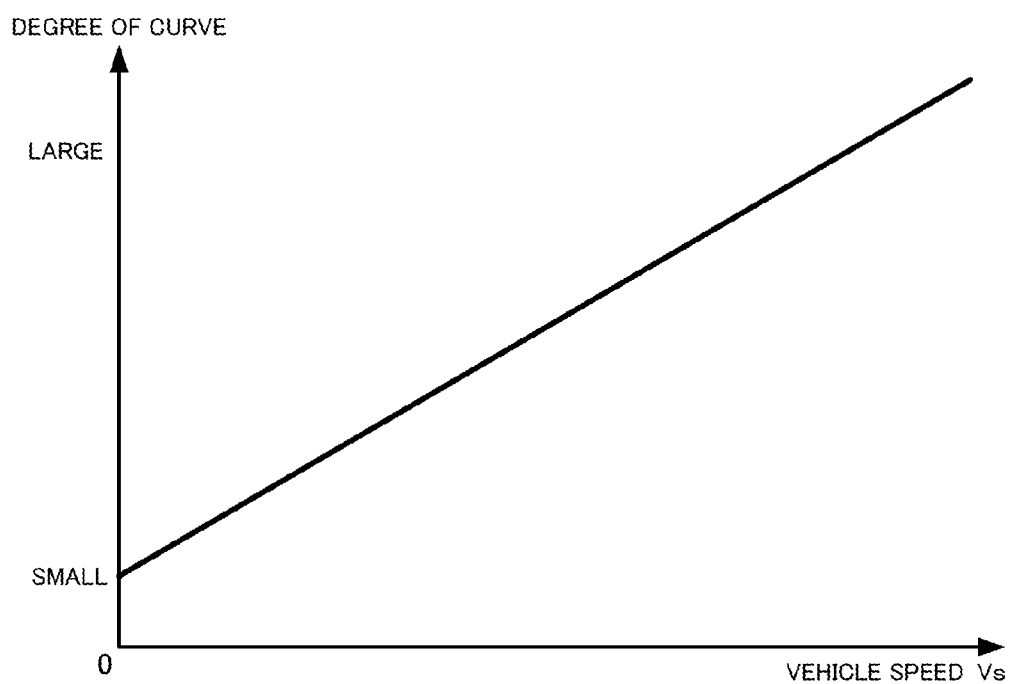
FIG. 11 is a characteristic view showing a varying example of a degree of a curve (vehicle speed sensitive)

In a case of the vehicle speed sensitive, the offset F1 of the above current command value Iref1 and the offset F2 of the above current command value Iref2 have characteristics that the offsets gradually decrease when the vehicle speed Vs is low and the offsets sharply decrease when the vehicle speed Vs is high as shown in FIG. 9. The characteristics of the offsets may sharply decease during the vehicle speed Vs is low and gradually decrease during the vehicle speed Vs is high. The flat characteristics of the current command values Iref1 and Iref2 have characteristics that an offset characteristic is narrower as the vehicle speed Vs becomes higher as shown in FIG. 10, or may be linearly narrower when the vehicle speed Vs is high. FIG. 11 shows a varying example of the degree of the curve to the vehicle speed Vs, and the degree of the curve linearly increases as the vehicle speed Vs becomes higher. The characteristic of the degree of the curve may decrease or may nonlinearly increase or decrease to the vehicle speed Vs.

Figure 12:
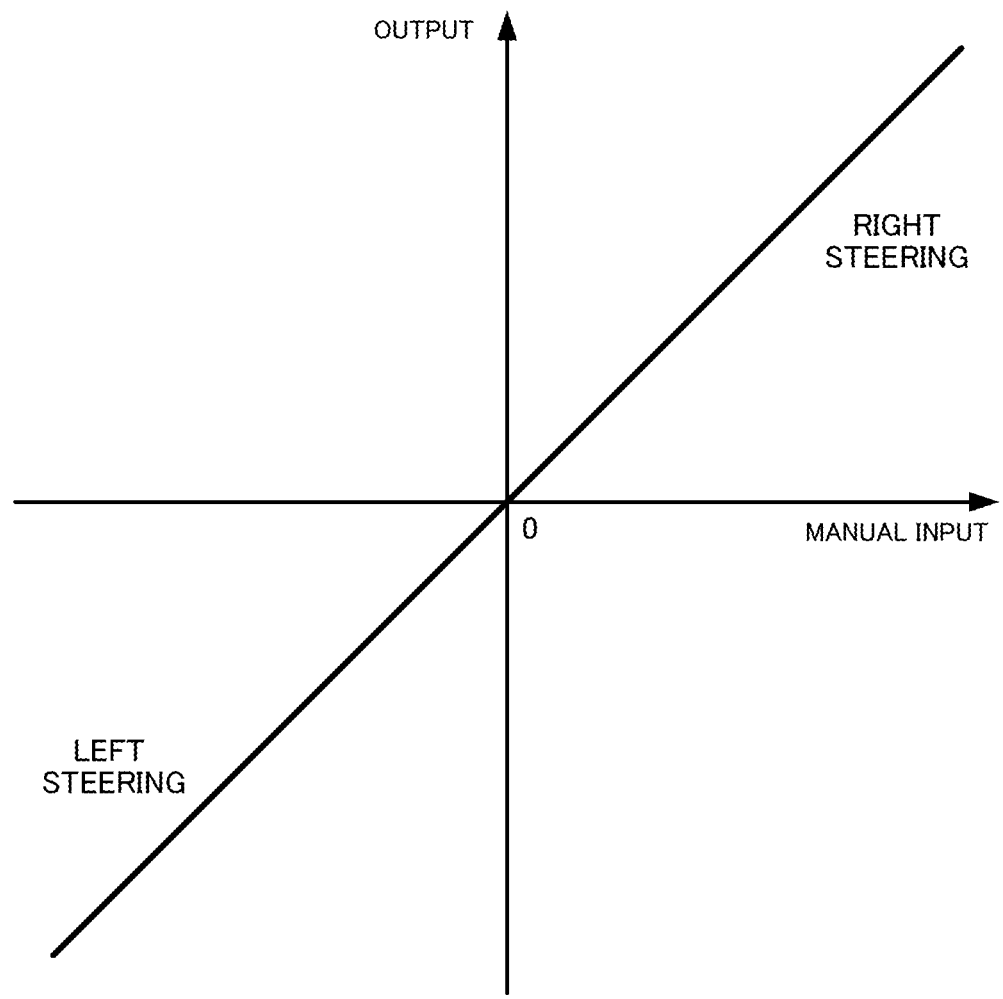
FIG. 12 is a characteristic view showing an example of an output characteristic of the present invention.

An output has a linear and smooth characteristic to the manual input, as shown in FIG. 12, by controlling such that the dead band does not exist near the handle center of the electric system and the characteristics are disproportionate at the left steering maneuver and a right steering maneuver. Especially, since the discontinuity is eliminated near the handle center, the steering feeling of the driver is improved.

Figure 13:
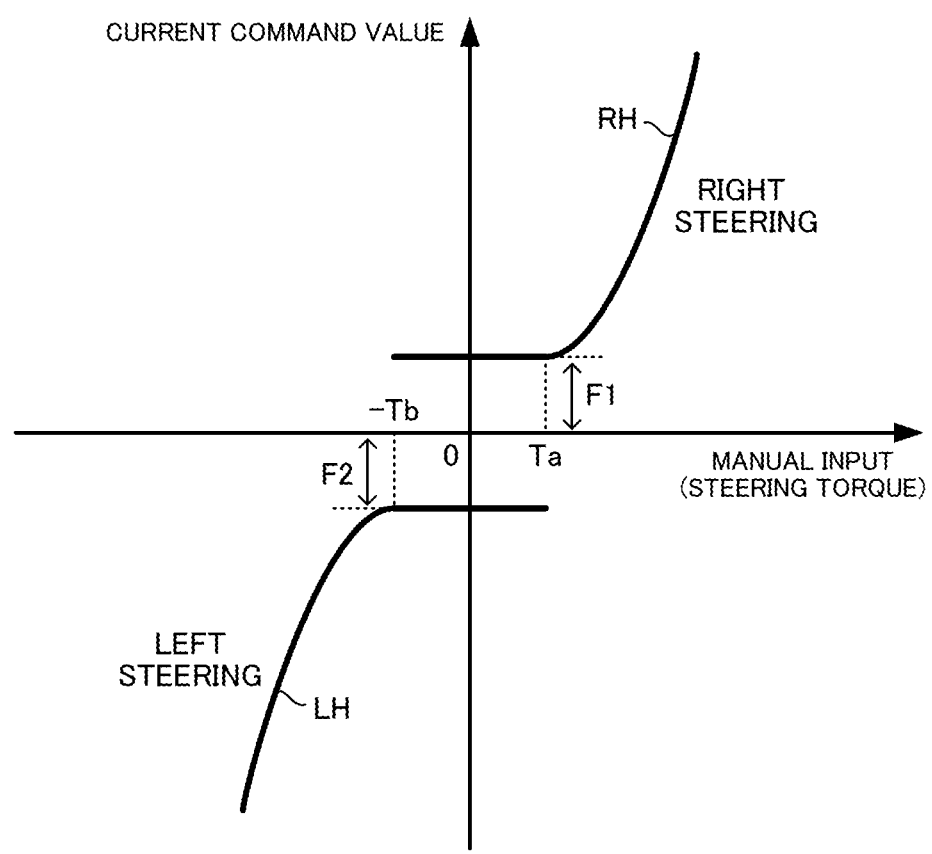
FIG. 13 is a characteristic view showing the operating principle (current command value characteristics) of the present invention (the second embodiment)

In the second embodiment of the present invention, as shown in FIG. 13, one system (the first system), for example, is used to a control of a right steering region, and the other system (the second system) is used to the left control of a left steering region. In the right steering region where the manual input (the steering torque) is positive, the current command value has the almost flat offset F1 until a predetermined value Ta and increases along a current command value characteristic RH as the manual input (steering torque) becomes larger than the predetermined value Ta. In the left steering region where the manual input (the steering torque) is negative, the current command value has the almost flat offset F2 until a predetermined value −Tb and decreases along the current command value characteristic LH as the manual input (the steering torque) becomes smaller than the predetermined value −Tb.

The characteristics of the right steering and the left steering are exchangeable, an absolute value |Ta| and an absolute value |−Tb| may be different or same, and the offset F1 and the offset F2 may be different (disproportion) or same (proportion). Especially, in order to prevent from the pull/drift of the vehicle, the offsets are set disproportionately. Further, varying characteristics of the current command value characteristic RH for the right steering and the current command value characteristic LH for the left steering are changeable, and the respective characteristics are freely set.

The judgement of the right steering and the left steering is performed in accordance with the above FIG. 7, and the configuration is similar to FIG. 8. The MCU 500 performs a judgement of the left steering or the right steering based on the steering torque Ts, the steering angle θ, the vehicle speed Vs and the so on, sets the offset of the right steering F1 or the offset of the left steering F2, and further calculates the current command value Iref1 for the right steering or the current command value Iref2 for the left steering. The current command value Iref1 for the right steering has the characteristic RH, for example, as shown in FIG. 13, and the current command value Iref2 for the left steering has the characteristic LH. The current command value Iref1 for the right steering is not zero near the handle center and has the predetermined offset F1, and the current command value Iref2 for the left steering is not zero near the handle center and has the predetermined offset F2. The first system and the second system of the motor are in a driven state near the handle center. Accordingly, the dead band does not exist near the handle center, the motor is driven by the individual systems, and steering is not discontinuous due to the inflection point or the like.

Figure 14:
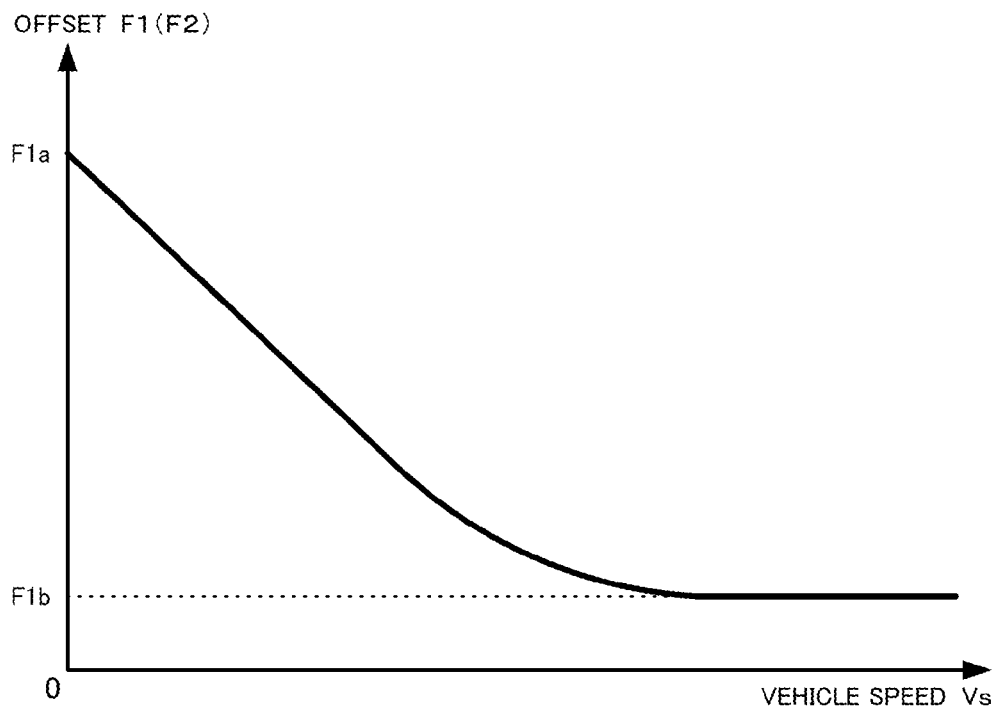
FIG. 14 is a characteristic view showing a varying example of an offset (vehicle speed sensitive)

The offset F1 of the current command value Iref1 for the right steering and the offset F2 of the current command value Iref2 for the left steering have characteristics as shown in FIG. 9, or may have characteristics that sharply decrease when the vehicle speed Vs is low and gradually decrease as the vehicle speed Vs becomes higher as shown in FIG. 14.

As stated-above, in the second embodiment, the output has the linear characteristic to the manual input as shown in FIG. 12, the discontinuity is eliminated near the handle center and the smooth characteristic is realized by controlling such that the dead band does not exist near the handle center of the electric system and the characteristics are disproportionate at the left steering maneuver and the right steering maneuver.

Figure 15:
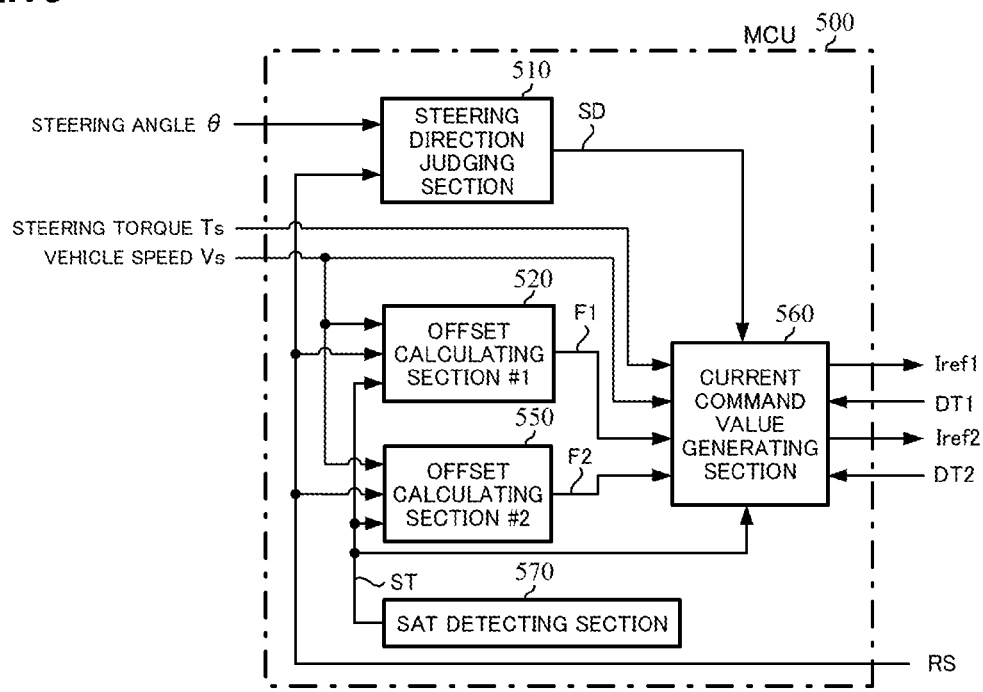
FIG. 15 is a block diagram showing a configuration example of an MCU.

Next, a concrete configuration example of the MCU 500 will be described with reference to FIG. 15. The MCU 500 comprises a steering direction judging section 510, offset calculating sections 520 and 550, a current command value generating section 560 and an SAT detecting section 570.

The steering angle θ and the rotational angle RS are inputted into the steering direction judging section 510, the steering direction judging section 510 calculates the angular speed ω from the rotational angle RS, and judges the steering direction (the left steering or the right steering) by using the steering angle θ and the angular speed ω in accordance with a distinction as shown in FIG. 7. A judgement result SD is inputted into the current command value generating section 560.

The SAT detecting section 570 detects an SAT value ST, and the SAT value ST is inputted into the offset calculating sections 520 and 550 and the current command value generating section 560. The SAT value ST may be detected by a disposed SAT sensor or may be estimated based on the steering torque Ts, the angular speed ω and so on.

Figure 16:
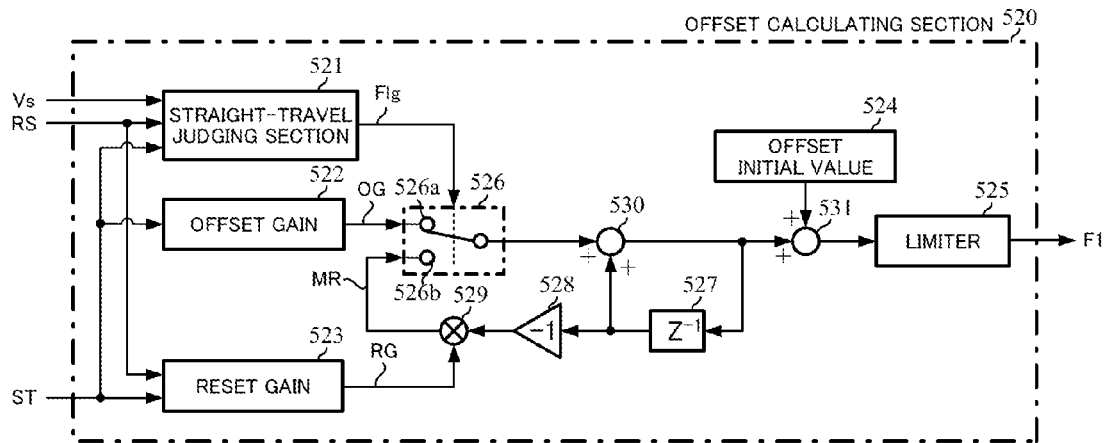
FIG. 16 is a block diagram showing a configuration example of an offset calculating section (the first example)

The offset calculating section 520 has a configuration as shown in FIG. 16. The vehicle speed Vs, the rotational angle RS and the SAT value ST are inputted into the offset calculating section 520, and the offset calculating section 520 calculates the offset F1. The offset calculating section 520 includes a straight-travel judging section 521 which judges a straight-travel of the vehicle based on the vehicle speed Vs, the rotational angle RS and the SAT value ST, and switches contact points 526a and 526b by inputting a judging signal Flg from the straight-travel judging section 521 to a switch 526. An offset gain OG which is outputted from an offset gain section 522 is inputted into the contact point 526a of the switch 526, and in a case that the straight-travel judging section 521 judges the straight-travel of the vehicle, the judging signal Flg is set to "1", and the contact point of the switch 526 switches to the contact point 526a.

Figure 17:
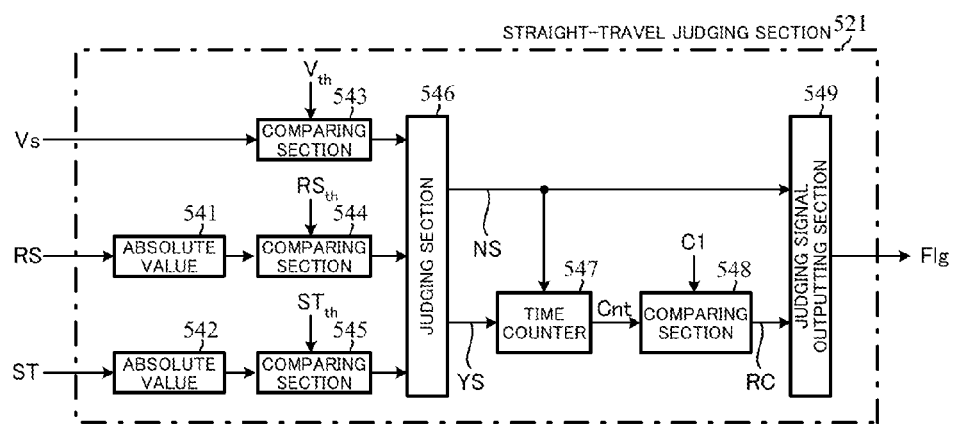
FIG. 17 is a block diagram showing a configuration example of a straight-travel judging section.

A configuration of the straight-travel judging section 521 is shown in FIG. 17, the vehicle speed Vs is inputted into a comparing section 543 which compares to a threshold $V_{th}$, the rotational angle RS is converted to an absolute value at an absolute value section 541 and then is inputted into a comparing section 544 which compares to a threshold $RS_{th}$, and the SAT value ST is converted to an absolute value at an absolute value section 542 and then is inputted into a comparing section 545 which compares to a threshold $ST_{th}$. Comparison results at the comparing sections 543 to 545 are judged at the judging section 546, and in a case that the comparison results are satisfied with all conditions, the judging section 546 outputs a straight-travel signal YS, counts-up a time counter 547 by the straight-travel signal YS, and inputs a count value Cnt into a comparing section 548 which compares to a threshold C1. A comparison result RC of the comparing section 548 is inputted into a judging signal outputting section 549. In a case that at least one of the comparison results of the comparing sections 543 to 545 is not satisfied with the conditions, the judging section 546 outputs a non-straight-travel signal NS, and the non-straight-travel signal NS resets the time counter 547 and is inputted into the judging signal outputting section 549. The judging signal outputting section 549 outputs the judging signal Flg based on the non-straight-travel signal NS and the comparison result RC.

Figure 18A:
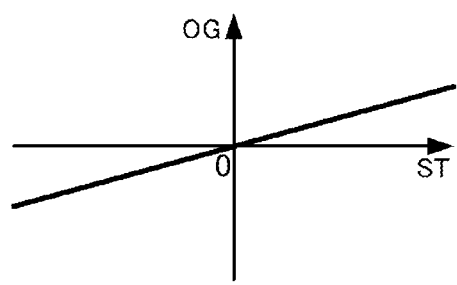
FIGS. 18A and 18B are characteristic views showing a gain characteristic example of an offset gain section.

The offset gain section 522 outputs an offset gain OG sensitive to the SAT value ST. FIG. 18A shows a gain characteristic example of the offset gain section 522, the offset gain OG is zero when the SAT value ST is zero, and the offset gain OG is larger as the SAT value ST becomes larger.

Figure 19:
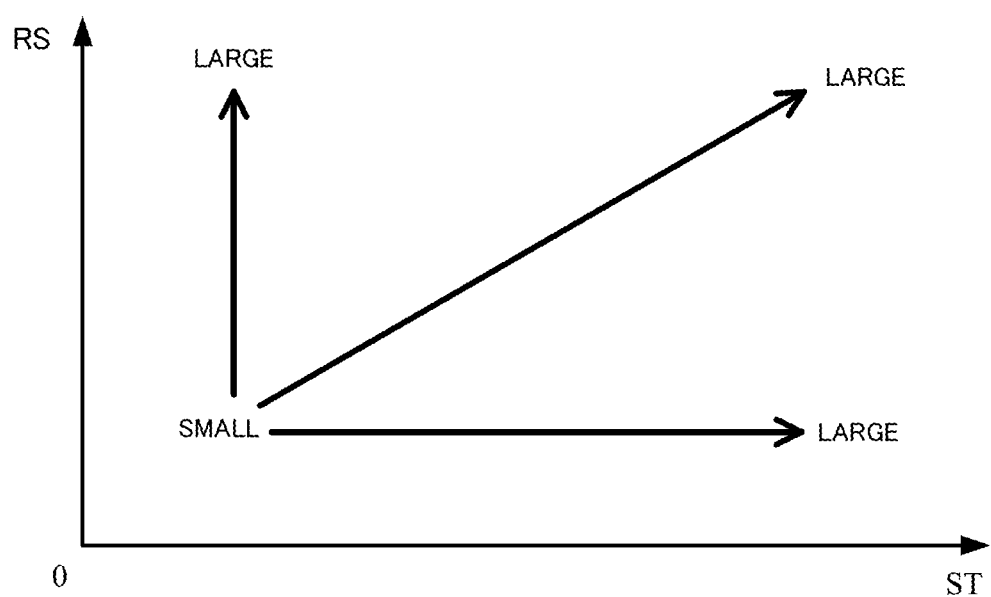
FIG. 19 is a characteristic view showing a gain characteristic example of a reset gain section.

The offset calculating section 520 includes a reset gain section 523 which outputs a reset gain RG sensitive to the SAT value ST and the rotational angle RS, the reset gain RG is inputted into a multiplying section 529, and a multiplied result MR is inputted into a contact point 526b of the switch 526. When the straight-travel judging section 521 does not judge that the vehicle is straight-travel, the judging signal Flg is "0" and the contact point of the switch 526 switches to the contact points 526b. FIG. 19 shows a gain characteristic example of the reset gain section 523, and an output gain characteristic of the reset gain RG is larger when any of the SAT value ST and the rotational angle RS becomes large.

The output of the switch 526 is inputted into an adding section 530, and the added result is inputted into an adding section 531 and is inputted into a memory unit 527 that memorizes and stores a value prior to one sampling. The value prior to one sampling from the memory unit 527 is inputted into the adding section 530, is added to the output of the switch 526, is inverted a sign at the inverting section 528, and then is inputted into the multiplying section 529. A multiplied result MR at the multiplying section 529 which this inverted result is multiplied with the reset gain RG, is inputted into the contact point 526b of the switch 526. An added result at the adding section 531 which the calculated result at the adding section 530 is added to the offset initial value 524 is inputted into the limiter 525, and a signal limited at the limiter 525 is outputted as the offset F1.

Figure 18B:
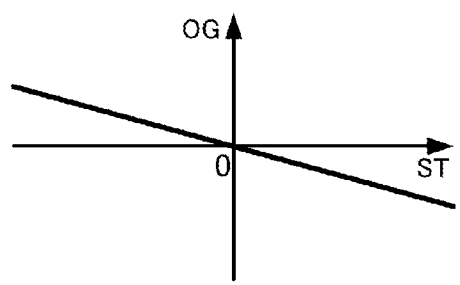

The offset calculating section 550 has the same configuration of the offset calculating section 520, the vehicle speed Vs, the rotational angle RS and the SAT value ST are inputted into the offset calculating section 550, and the offset F2 is calculated. The gain characteristic of the offset gain section is different from that of the offset calculating section 520. FIG. 18B shows the gain characteristic example of the offset gain section of the offset calculating section 550, the offset gain OG is zero when the SAT value ST is zero, and the offset gain OG is smaller as the SAT value ST becomes larger.

Figure 2:
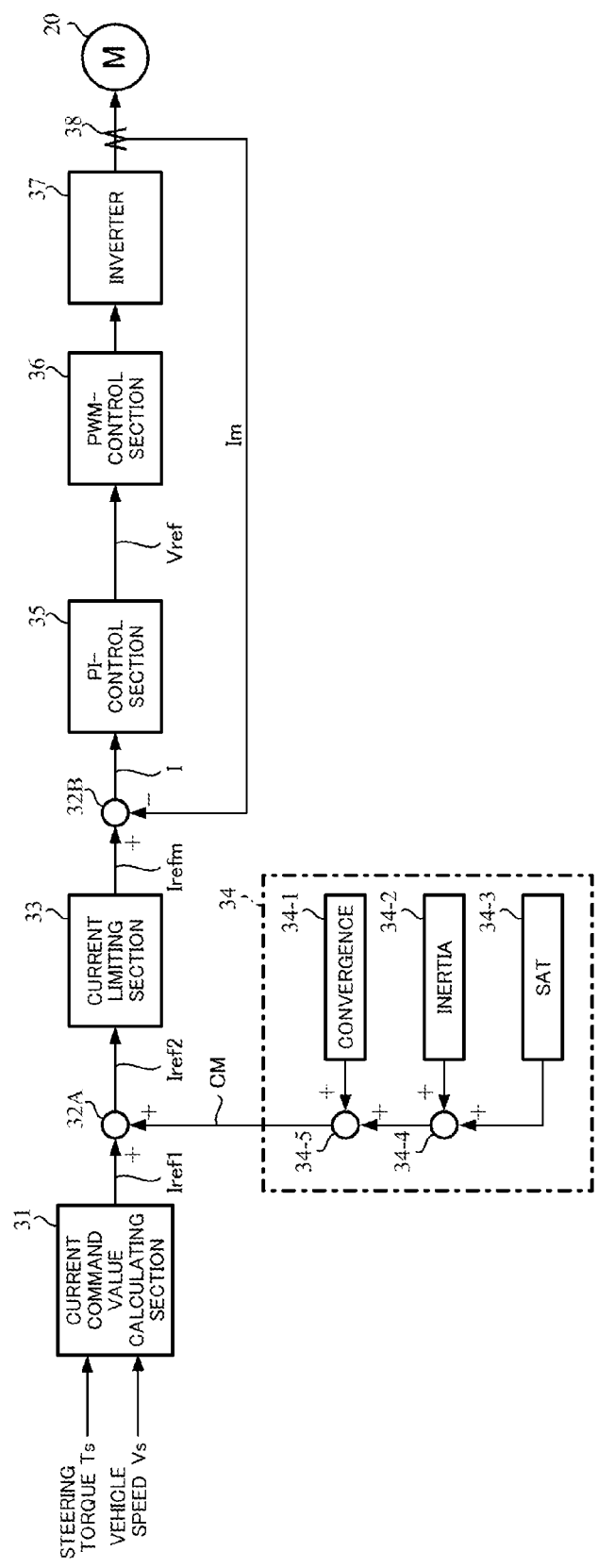
FIG. 2 is a block diagram showing a structure example of a control unit (ECU) of the electric power steering apparatus.
Figure 3:
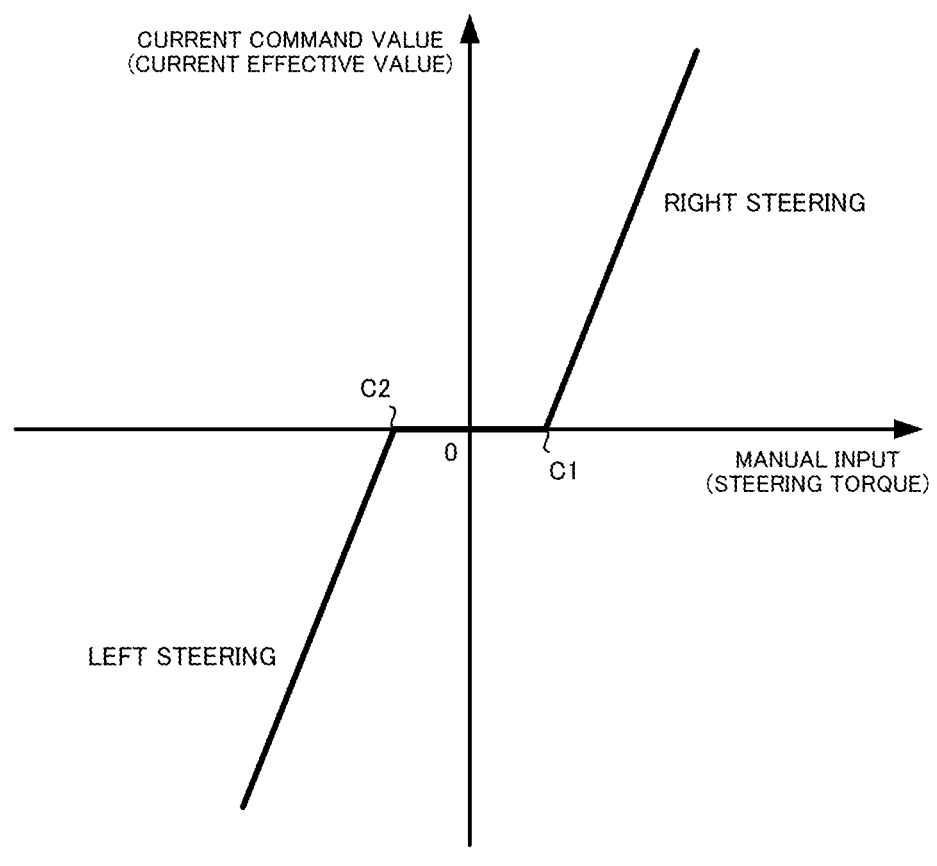
FIG. 3 is a characteristic view showing a characteristic example near a handle center in the conventional apparatus.

A current command value generating section 560 comprises a current command value calculating section, a current limiting section, a compensation signal generating section, an adding section and a subtracting section, for example, as shown in FIG. 2. The current command value Iref which the current command value calculating section of the current command value generating section 560 calculates, has a characteristic, for example, as shown in FIG. 6 or FIG. 13, and the offset F1 outputted from the offset calculating section 520 and the offset F2 outputted from the offset calculating section 550 are used.

Figure 20:
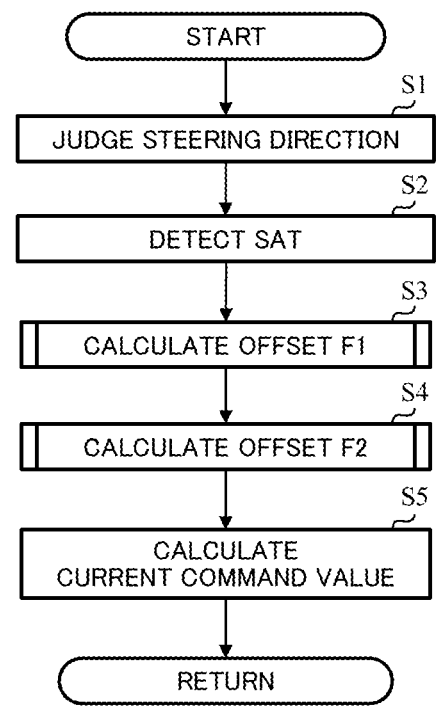
FIG. 20 is a part of flowchart showing an operating example of the present invention (the first example)
Figure 21:
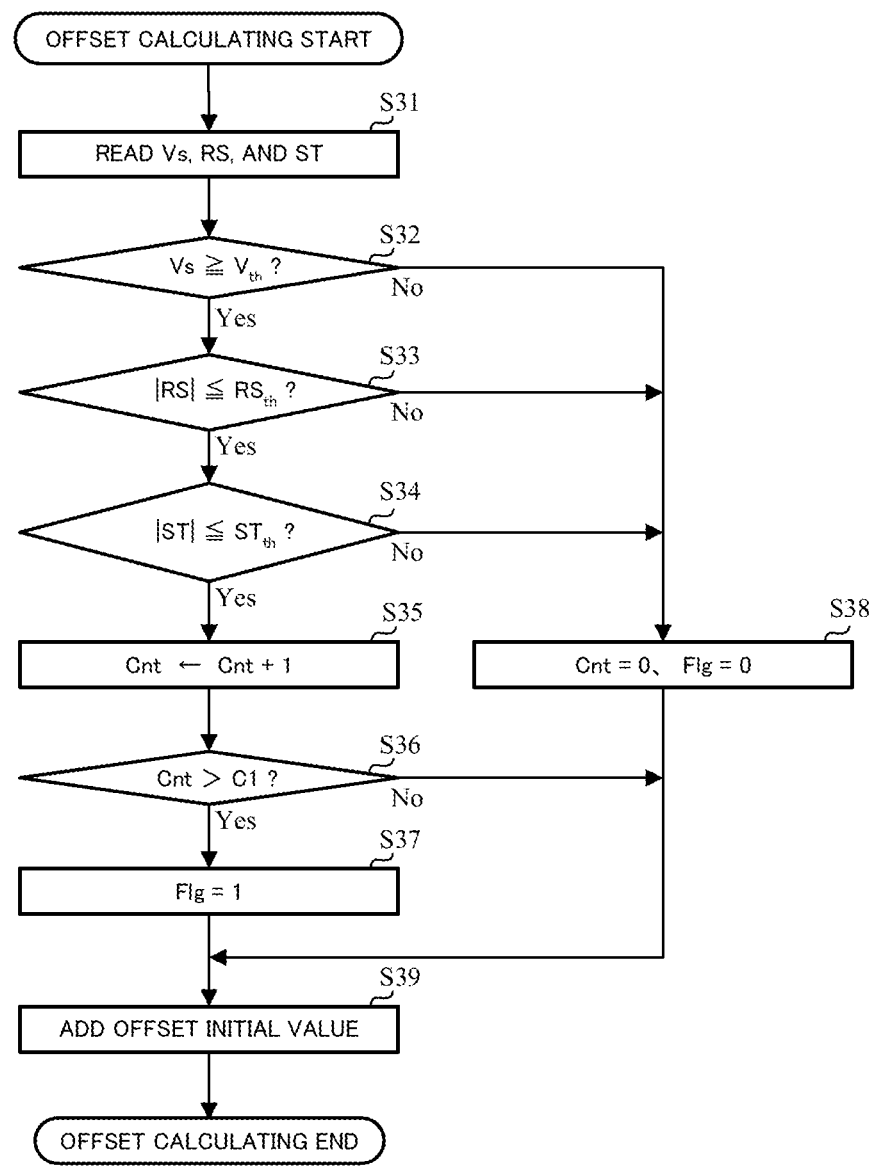
FIG. 21 is another part of flowchart showing an operating example of the present invention (the first example)

In such the configuration, an operating example will be described with reference to flowcharts of FIGS. 20 and 21.

When an operation is started, the steering direction judging section 510 reads the steering angle θ and the rotational angle RS, calculates the angular speed ω from the rotational angle RS, judges the steering direction in accordance with the distinction as shown in FIG. 7, and outputs a judgement result SD (the left steering or the right steering) (Step S1).

The SAT detecting section 570 detects the SAT value ST, and outputs the SAT value ST to the offset calculating sections 520 and 550 and the current command value generating section 560 (Step S2).

The offset calculating section 520 calculates the offset F1 by using the vehicle speed Vs, the rotational angle RS and the SAT value ST (Step S3).

In the calculation of the offset F1, at first, the straight-travel judging section 521 reads the vehicle speed Vs, the rotational angle RS and the SAT value ST (Step S31). The SAT value ST is inputted into the offset gain section 522 and the reset gain section 523, and the rotational angle RS is inputted into the reset gain section 523.

The vehicle speed Vs which is read to the straight-travel judging section 521 is inputted into the comparing section 543, and the comparing section 543 judges whether the vehicle speed Vs is equal to or more than the threshold $V_{th}$ or not (Step S32). In a case that the vehicle speed Vs is equal to or more than the threshold $V_{th}$, the absolute value |RS| of the rotational angle RS is calculated at the absolute value section 541, and the comparing section 544 judges whether the absolute value |RS| of the rotational angle RS is equal to or less than the threshold $RS_{th}$ or not (Step S33). In a case that the absolute value |RS| of the rotational angle RS is equal to or less than the threshold $RS_{th}$, the absolute value |ST| of the SAT value ST is calculated at the absolute value section 542, and the comparing section 545 judges whether the absolute value |ST| of the SAT value ST is equal to or less than the threshold $ST_{th}$ or not (Step S34). The straight-travel state can be precisely detected when the vehicle speed Vs is high. Generally, the judgement based on small rotation angles and small SATs in the straight-travel state, is performed. An order of Steps S32 to S34 is arbitrary and appropriately changeable.

The comparison results of the comparing sections 543 to 545 are inputted into the judging section 546, the straight-travel signal YS is outputted from the judging section 546 when all conditions are satisfied, and the count value Cnt of the time counter 547 which measures an elapsed time adds "+1" (Step S35). Next, the comparing section 548 judges whether the count value Cnt is larger than the threshold C1 or not, that is, whether a predetermined time is elapsed or not (Step S36). In a case that the count value Cnt is larger than the threshold C1, that is, the predetermined time is elapsed, the comparing section 548 outputs the comparison result RC to the judging signal output section 549, the judging signal output section 549 sets the judging signal Flg to "1" (Step S37), and the contact point of the switch 526 is switched to the contact point 526a. Then, the offset gain OG, which the offset gain section 522 sets to the characteristic shown in FIG. 18A by using the SAT value ST, is inputted into the adding section 530 via the switch 526, is added to the data prior to one sampling of the memory unit 527, and then is inputted into the adding section 531. The offset is adjusted by detecting the pull/drift by means of utilizing to occur a decrease in the straight-travel feeling (the on-center feeling) by an inclination of the road surface or the like and to occur the reaction force by which the directions of tires are changed.

On the other hand, in a case that the vehicle speed Vs is lower than the threshold $V_{th}$ at the above Step S32, the absolute value |RS| of the rotational angle RS is larger than the threshold $RS_{th}$ at the above Step S33, or the absolute value |ST| of the SAT value ST is larger than the threshold $ST_{th}$ at the above Step S34, the judging section 546 outputs the non-straight-travel signal NS to the time counter 547 and the judging signal output section 549. Then, the count value Cnt is reset to zero, the judging signal Flg outputted from the judging signal output section 549 is set to "0", and the contact point of the switch 526 switches to the contact 526b (Step S38). By this switching, the data prior to one sampling of the memory unit 527 is inverted a sign at the inverting section 528, and then is inputted into the multiplying section 529. The multiplied result MR at the multiplying section 529 which this inverted result is multiplied with the reset gain RG which is set to the characteristic shown in FIG. 19, is inputted into the adding section 530 via the switch 526, and the added result is further inputted into the adding section 531. In this case, the vehicle is deviated from the straight-travel state, the offset gain OG is gradually close to zero, and is finally zero.

The offset initial value 524 is added at the adding section 531 (Step S39), and the added value is limited such that the maximum value and the minimum value (larger than zero) thereof are restricted by the limiter 525, and is outputted as the offset F1.

The offset calculating section 550 calculates the offset F2 by using the vehicle speed Vs, the rotational angle RS and the SAT value ST (Step S4). Since the calculation process of the offset F2 is similar to that of the offset F1, an explanation is omitted. In the offset gain setting of the offset gain section, the characteristic shown in FIG. 18B is used.

The current command value generating section 560 applies the characteristic, for example, as shown in FIG. 6 or FIG. 13 to the current command value Iref by using the offset F1 outputted from the offset calculating section 520 and the offset F2 outputted from the offset calculating section 550, and outputs the current command value Iref1 for the right steering and/or the current command value Iref2 for the left steering based on a judging result SD outputted from the steering direction judging section 510 (Step S5). Since the current command values Iref1 for the right steering and the current command values Iref2 for the left steering are not zero near the handle center, the first system and the second system of the motor are in a driven state. Accordingly, the dead band does not exist near the handle center, the right steering and the left steering are individually driven, and steering is not discontinuous due to the inflection point or the like.

Figure 22A:
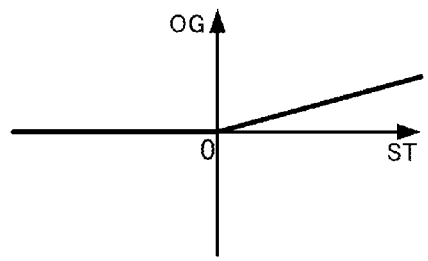
FIGS. 22A to 22D are characteristic views showing variation examples of a gain characteristic of the offset calculating section.
Figure 22B:
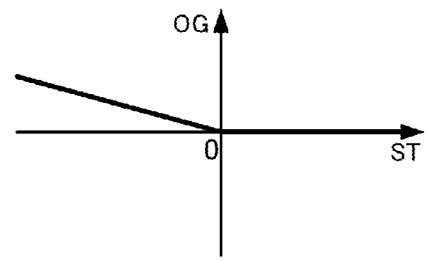
Figure 22C:
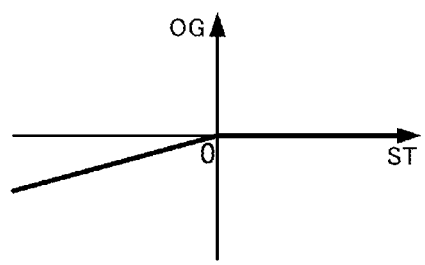
Figure 22D:
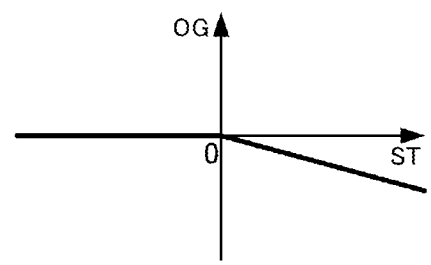

The gain characteristic of the offset gain section 522 of the offset calculating section 520 may have a characteristic that the offset gain is zero when the SAT value ST is equal to or less than zero, as shown in FIG. 22A. Similarly, the gain characteristic of the offset gain section of the offset calculating section 550 may have a characteristic that the offset gain is zero when the SAT value ST is equal to or more than zero, as shown in FIG. 22B. In this case, in the region of right steering where the acting force (for example, the SAT value) is a positive direction, the offset F1 is only changed, and in the region of the left steering where the acting force is a negative direction, the offset F2 is only changed. Alternatively, the gain characteristic of the offset gain section 522 of the offset calculating section 520 may have a characteristic that the offset gain is zero when the SAT value ST is equal to or more than zero, as shown in FIG. 22C. The gain characteristic of the offset gain section of the offset calculating section 550 may have a characteristic that the offset gain is zero when the SAT value ST is equal to or less than zero, as shown in FIG. 22D. In this case, in the region of the right steering where the acting force is a positive direction, the offset F2 is only changed, and in the region of the left steering where the acting force is a negative direction, the offset F1 is only changed. The gain characteristics of the offset gain section 522 of the offset calculating section 520 and the offset gain section of the offset calculating section 550 may not be the same rate of changing (an absolute value of a gradient of a line), and may not be linearly changed and be curvedly changed. By adopting such the characteristics, an appropriate adjustment which is suitably adapted to a travel environment or the like can be performed.

In the above first example, the offset F1 and the offset F2 change in response to the SAT value, and may be changeable in response to the vehicle speed in addition to the SAT value. In order that the offsets are changeable in response to the vehicle speed, for example, a function is added to the offset calculating section.

Figure 23:
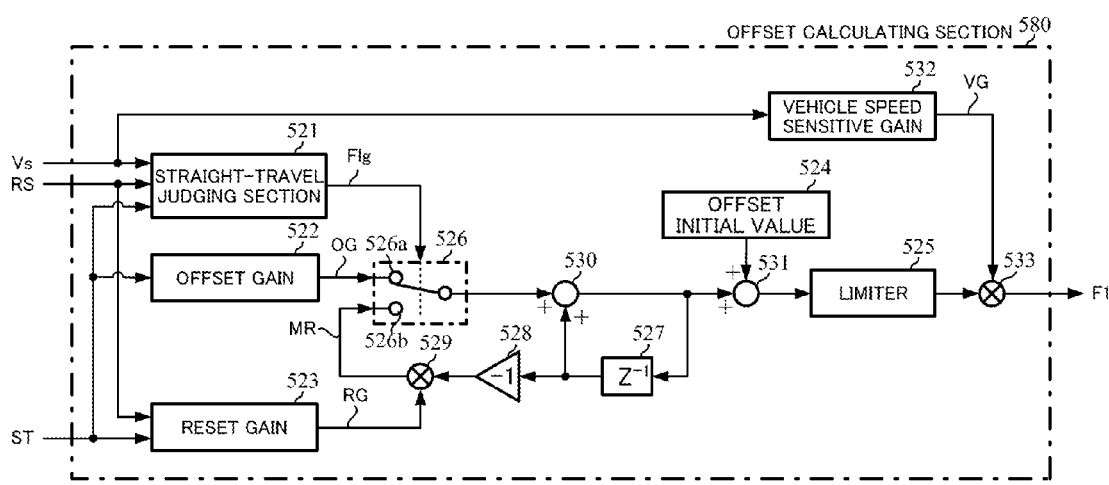
FIG. 23 is a block diagram showing a configuration example of an offset calculating section (the second example)

FIG. 23 shows a block diagram of a configuration example (the second example) of the offset calculating section which is added to the above function. In contrast to the offset calculating section 520 of the first example as shown in FIG. 16, a vehicle speed sensitive gain section 532 and a multiplying section 533 are added, and other configurations are the same as those of the first example. With respect to the configurations which are the same as those of the first example, since the operations are the same as those of the first example, the explanation is omitted.

Figure 24A:
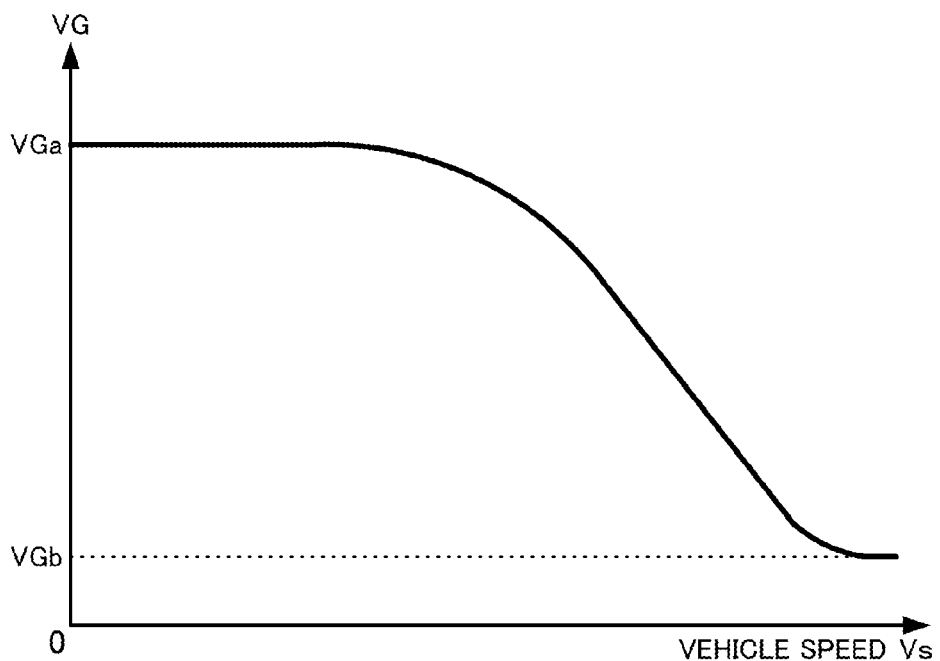
FIGS. 24A and 24B are characteristic views showing gain characteristic examples of a vehicle speed sensitive-gain section.
Figure 24B:
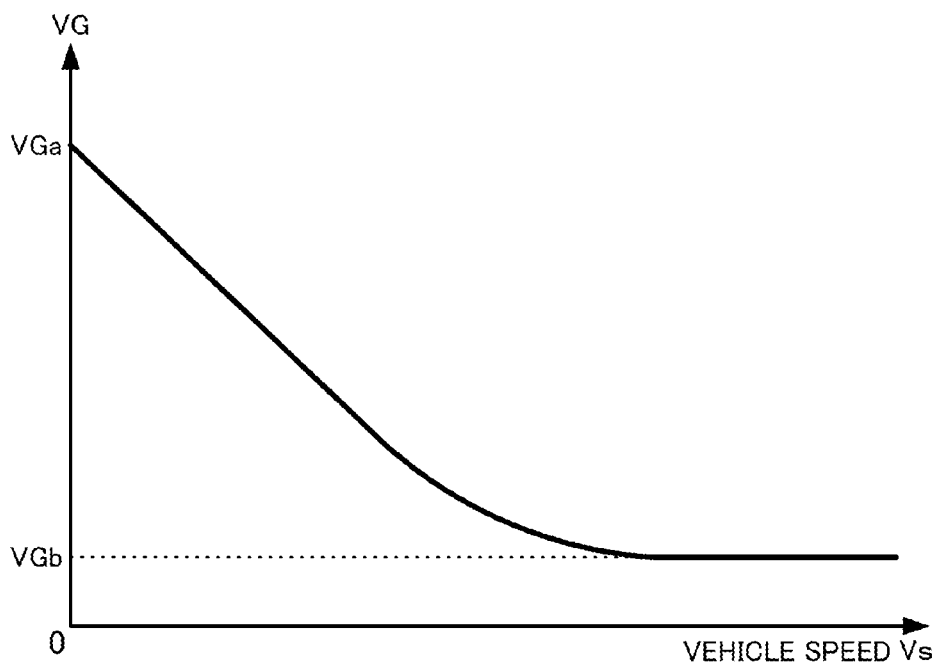

The vehicle speed sensitive gain section 532 outputs a vehicle speed gain VG sensitive to the vehicle speed Vs. FIG. 24A shows a gain characteristic example of the vehicle speed sensitive gain section 532, the vehicle speed gain VG gradually decreases when the vehicle speed is lower, and the vehicle speed gain VG sharply decreases as the vehicle speed becomes higher. As shown in FIG. 24B, the vehicle speed gain VG may sharply decrease when the vehicle speed is low, and the vehicle speed gain VG may gradually decrease as the vehicle speed becomes higher.

The vehicle speed Vs, the rotational angle RS, and the SAT value ST are inputted into the offset calculating section 580, and the offset calculating section 580 calculates the offset F1, as well as the offset calculating section 520. The offset F1 whose maximum value and minimum value are limited by the limiter 525 is multiplied with the vehicle gain VG in the multiplying section 533, and the multiplied result is outputted.

With respect to the offset F2, the vehicle speed gain is multiplied with the similar configurations and the similar operations.

Since the adjustment of the current command value near the handle center in response to the travel state is appropriately performed by changing the offsets sensitive to the vehicle speed, the steering feeling of the driver can be improved.

In the first example, the SAT value ST is used as the acting force which is applied to the steering mechanism. The steering torque Ts may be used as the acting force.

Figure 25:
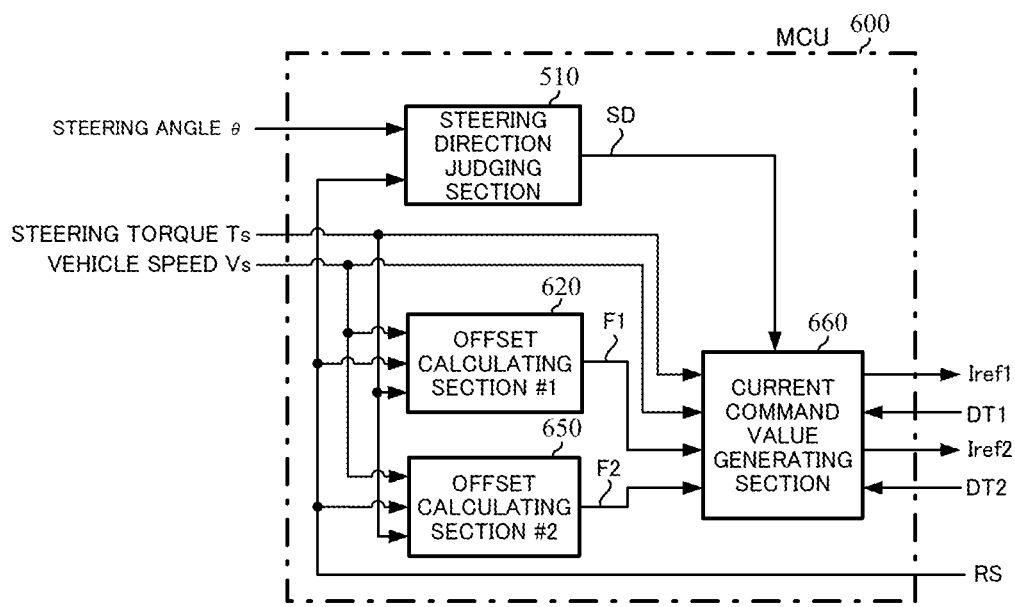
FIG. 25 is a block diagram showing another configuration example of the MCU.

FIG. 25 shows the configuration example of the MCU in a case that the steering torque Ts is used as the acting force. In comparison to the MCU 500 shown in FIG. 15, the SAT detecting section 570 is removed, and the steering torque Ts instead of the SAT value ST is inputted into the offset calculating sections. Thus, the steering torque Ts instead of the SAT value ST is inputted into the straight-travel judging section, the offset gain section, and the reset gain section which are shown in FIG. 16. Other configurations are the same as the embodiment of FIG. 15. Because it is not necessary to detect the SAT, the configurations are more simplified.

Using the steering torque Ts instead of the SAT value ST is only different between the operations of the offset calculating sections 620 and 650 and those of the offset calculating sections 520 and 550. Other operations are the same as those of the offset calculating sections 520 and 550, and the similar effect is obtained.

Figure 26A:
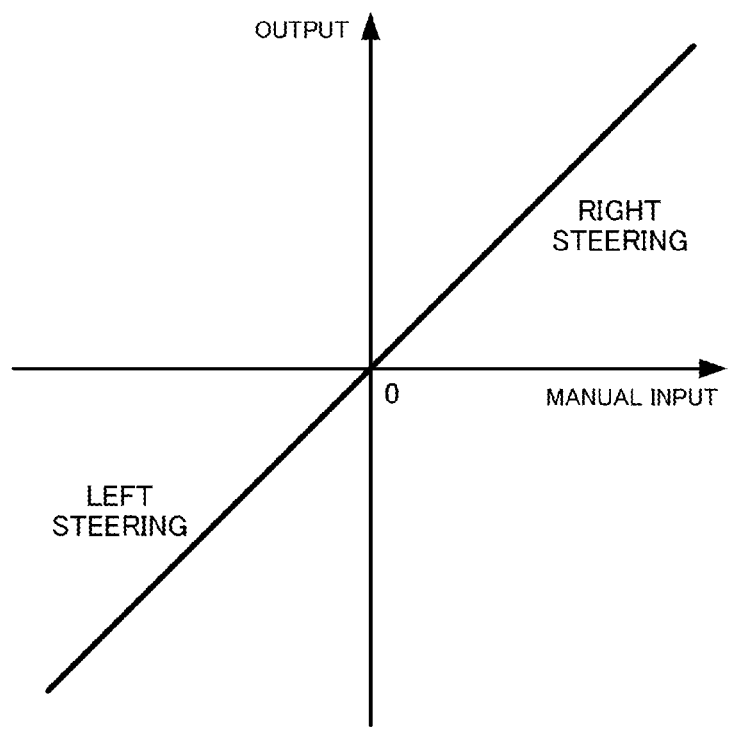
FIGS. 26A and 26B are characteristic views showing an example of an output characteristic of the present invention.
Figure 26B:
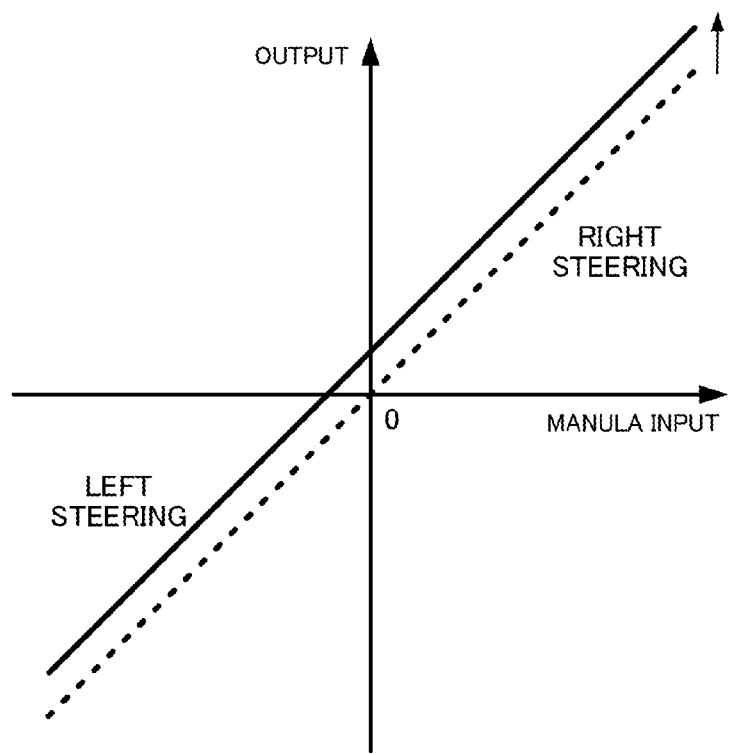

According to the present invention, by eliminating the dead band near the handle center of the electric system and controlling the disproportionate torque generation when steering left or right, the output against the manual input is linear as shown in FIG. 26A, and the smooth characteristic is obtained. Especially, because the discontinuity near the handle center is removed, the steering feeling of the driver is improved. Further, since the output characteristic against the manual input is shifted, for example, as shown in FIG. 26B, and the output is corrected by adjusting the offset of the current command value even when the pull/drift is occurred in the straight-travel state, the stress of the driver decreases.

In the above embodiment, the MCU includes two offset calculating sections. One offset calculating section which calculates the offsets F1 and F2 may be constructed. Thereby, the configurations can be simplified.

In the above embodiment, the motor with the dual-system motor windings is exemplified, and it can be applied to the motor with the multi-system motor windings which are at least triple-system motor windings. Further, in the above embodiment, the motor is driving-controlled by the GDMs, and the configuration in which a PI control section, a PWM control section, the inverters, and the like are included may be used. The explanation of operations of left steering and right steering are above-described and conversely.

EXPLANATION OF REFERENCE NUMERALS 1 handle
2 column shaft (steering shaft, handle shaft)
10 torque sensor
12 vehicle speed sensor
14 steering angle sensor
20 motor 30 control unit (ECU)
40 CAN
100 control unit (ECU)
121, 122 GDM
200 dual-system motor
201 rotational sensor
500 MCU
510 steering direction judging section
520 offset calculating section

The invention claimed is:

1. An electric power steering apparatus that driving-controls a motor via inverters based on a current command value which is a steering command, and applies an assist force by means of said motor to a steering system of a vehicle, comprising:
   multi-system driving systems with said inverters for respective system-windings of said motor which is a multi-system motor,
   wherein said electric power steering apparatus applies respective multi-system current command value characteristics against a steering torque so as to be disproportionate to said respective multi-system driving systems at a left steering maneuver and a right steering maneuver, and assist-controls in response to said individual current command value characteristics for said multi-system driving systems.

2. The electric power steering apparatus according to claim 1, wherein said multi-system current command value characteristics have offsets near a handle center and have characteristics that a difference of offset amounts is larger as an absolute value of said steering torque becomes larger.

3. The electric power steering apparatus according to claim 2, wherein a degree of said offset is changeable characteristic.

4. The electric power steering apparatus according to claim 3, wherein said changeable characteristic is a vehicle speed sensitive-characteristic.

5. The electric power steering apparatus according to claim 4, wherein said vehicle speed sensitive-characteristic has a smaller offset near said handle center, and has a larger or smaller degree of a difference of said offset amounts as said vehicle speed becomes higher.

6. The electric power steering apparatus according to claim 1, wherein all of said multi-system motor, said multi-system driving systems and said multi-system current command value characteristics are at least dual-system.

7. The electric power steering apparatus according to claim 6, wherein said motor has a dual-system windings of a star-connection.

8. The electric power steering apparatus according to claim 6, wherein said motor has a dual-system windings of a delta-connection.

9. The electric power steering apparatus according to claim 1, wherein all of said multi-system motor, said multi-system driving systems and said multi-system current command value characteristics are dual-system, one part of a dual-system motor is used to one direction region by a one-direction current command value, and other part of said dual-system motor is used to other direction region by an other-direction current command value.

10. The electric power steering apparatus according to claim 9, wherein said one-direction current command value has an offset 1 and said other-direction current command value has an offset 2 near a handle center.

11. The electric power steering apparatus according to claim 10, wherein said one-direction current command value increases as said steering torque becomes larger in said one direction region and said other-direction current command value increases as said steering torque becomes larger in said other direction region.

12. The electric power steering apparatus according to claim 11, wherein varying characteristics of said one-direction current command value and said other-direction current command value are changeable.

13. The electric power steering apparatus according to claim 10, wherein said offset 1 is equal to said offset 2.

14. The electric power steering apparatus according to claim 13, wherein said offset 1 and said offset 2 varies in response to said vehicle speed.

15. The electric power steering apparatus according to claim 10, wherein said offset 1 is different from said offset 2.

16. An electric power steering apparatus that driving-controls a motor via inverters based on a current command value which is a steering command, and applies an assist force by means of said motor to a steering mechanism of a vehicle;
   wherein said motor is at least dual-system motor and said inverters are provided for respective system-windings of said motor,
   wherein one part of said at least dual-system motor is used to one direction region by a one-direction current command value and other part of said at least dual-system motor is used to other direction region by an other-direction current command value, and
   wherein said one-direction current command value has an offset 1 and said other-direction current command value has an offset 2 near a handle center, and said offset 1 and said offset 2 are calculated based on a travel state of said vehicle and an acting force applied to said steering mechanism.

17. The electric power steering apparatus according to claim 16, wherein said offset 1 and said offset 2 vary in response to said acting force when said travel state of said vehicle is a straight-travel state.

18. The electric power steering apparatus according to claim 17, wherein in said straight-travel state, said offset 1 increases as said acting force becomes larger in said one direction region, and said offset 2 increases as said acting force becomes larger in said other direction region.

19. The electric power steering apparatus according to claim 17, wherein in said straight-travel state, said offset 2 decreases as said acting force becomes larger in said one direction region, and said offset 1 decreases as said acting force becomes larger in said other direction region.

20. The electric power steering apparatus according to claim 17, wherein said offset 1 and said offset 2 respectively return to initial values based on a rotational angle and said acting force of said steering mechanism when said vehicle deviates from said straight-travel state.

21. The electric power steering apparatus according to claim 17, wherein said offset 1 and said offset 2 gradually vary and gradually return to said respective initial values.

22. The electric power steering apparatus according to claim 16, wherein varying characteristics of said one-direction current command value and said other-direction current command value are changeable.

23. The electric power steering apparatus according to claim 16, wherein said acting force is a self-aligning torque or a steering torque.

* * * * *